United States Patent Office 3,547,732
Patented Dec. 15, 1970

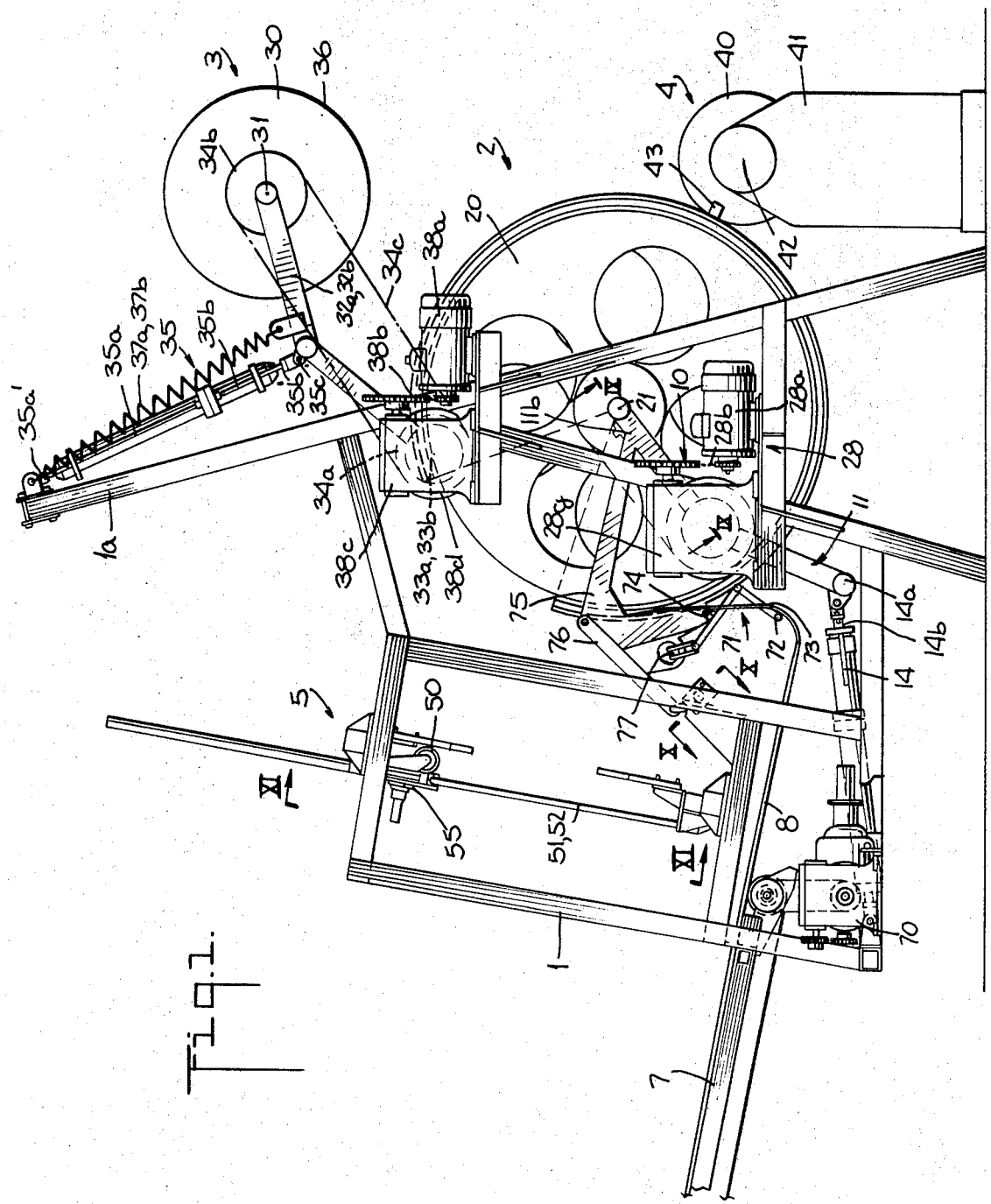

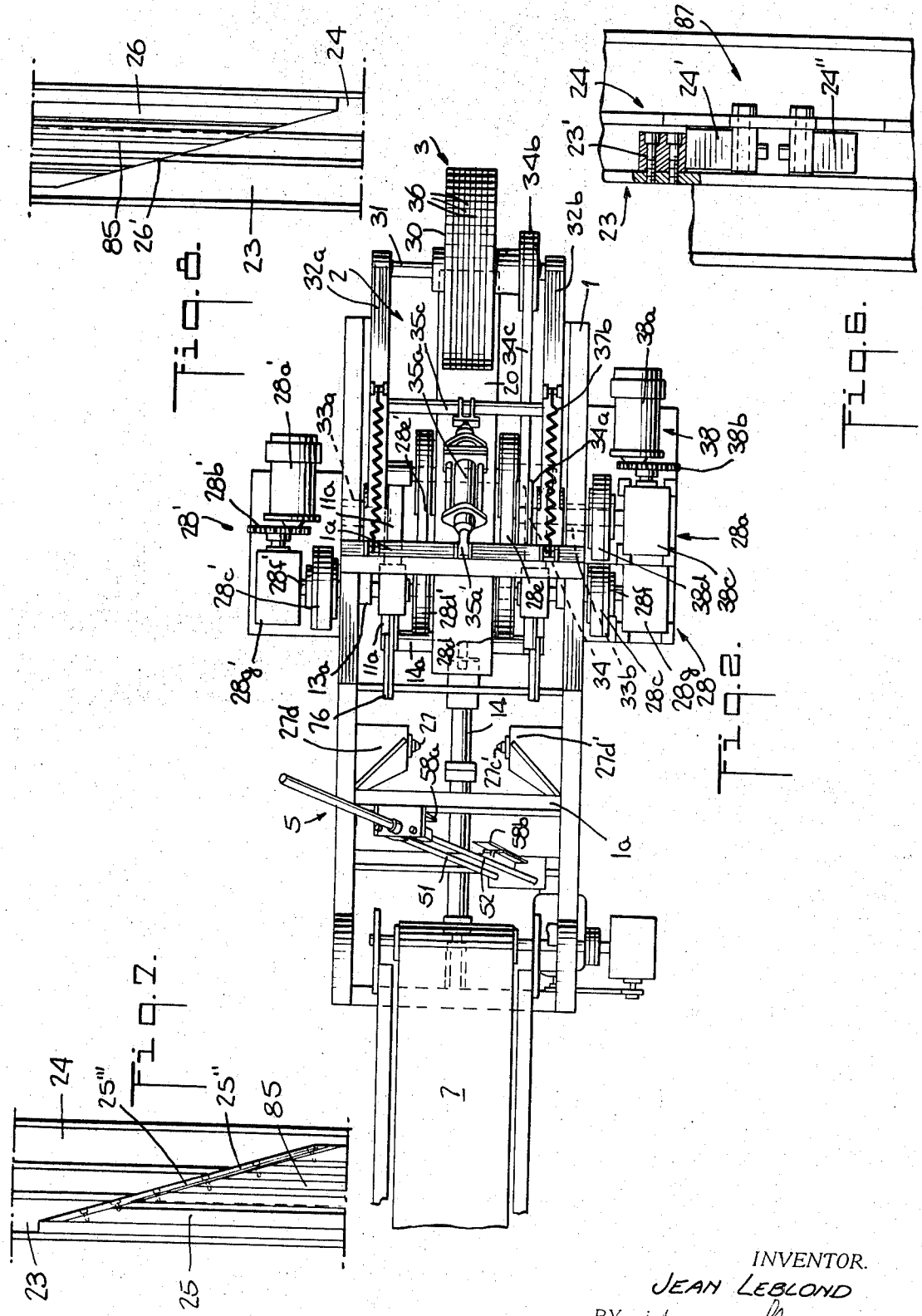

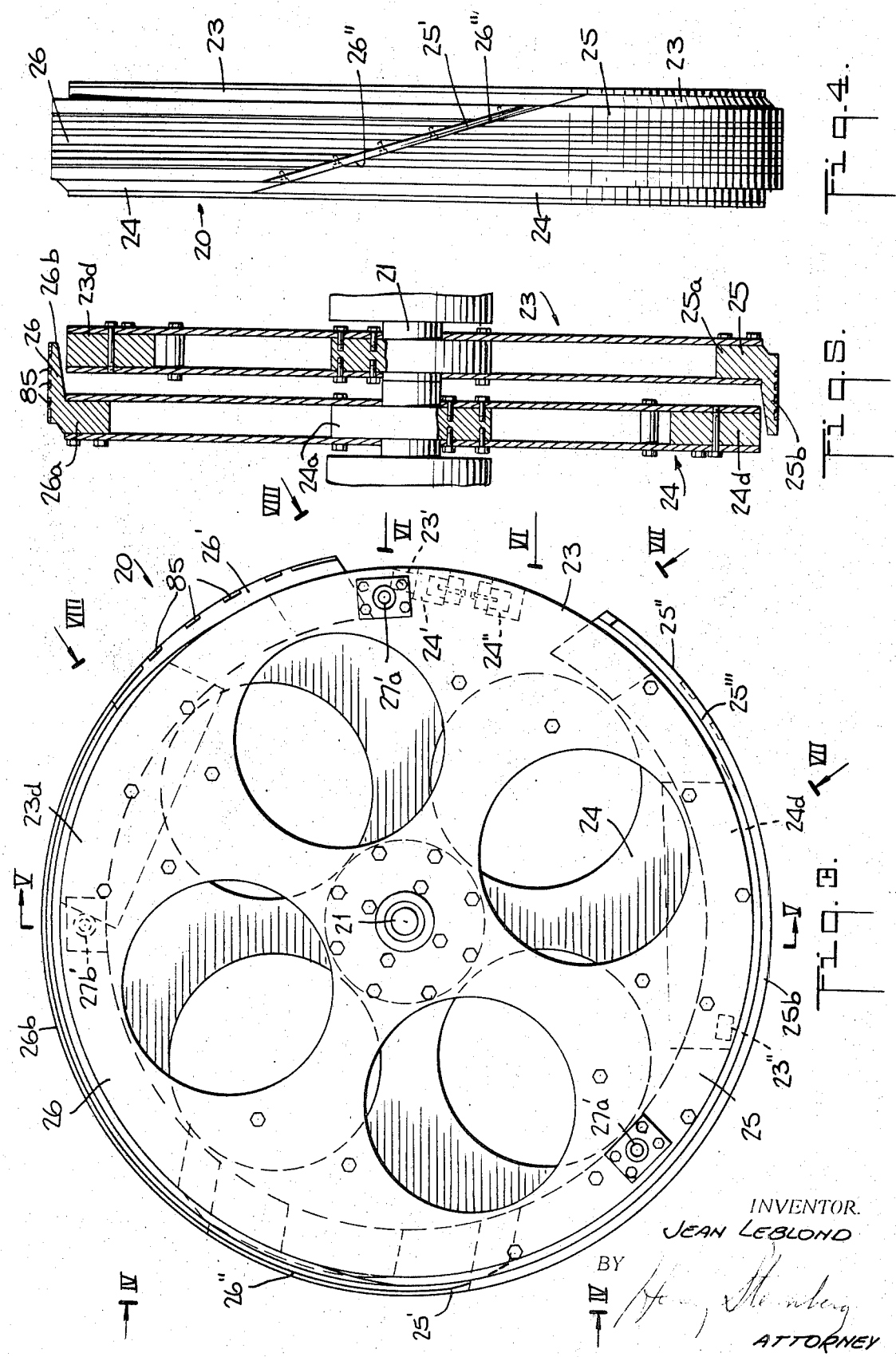

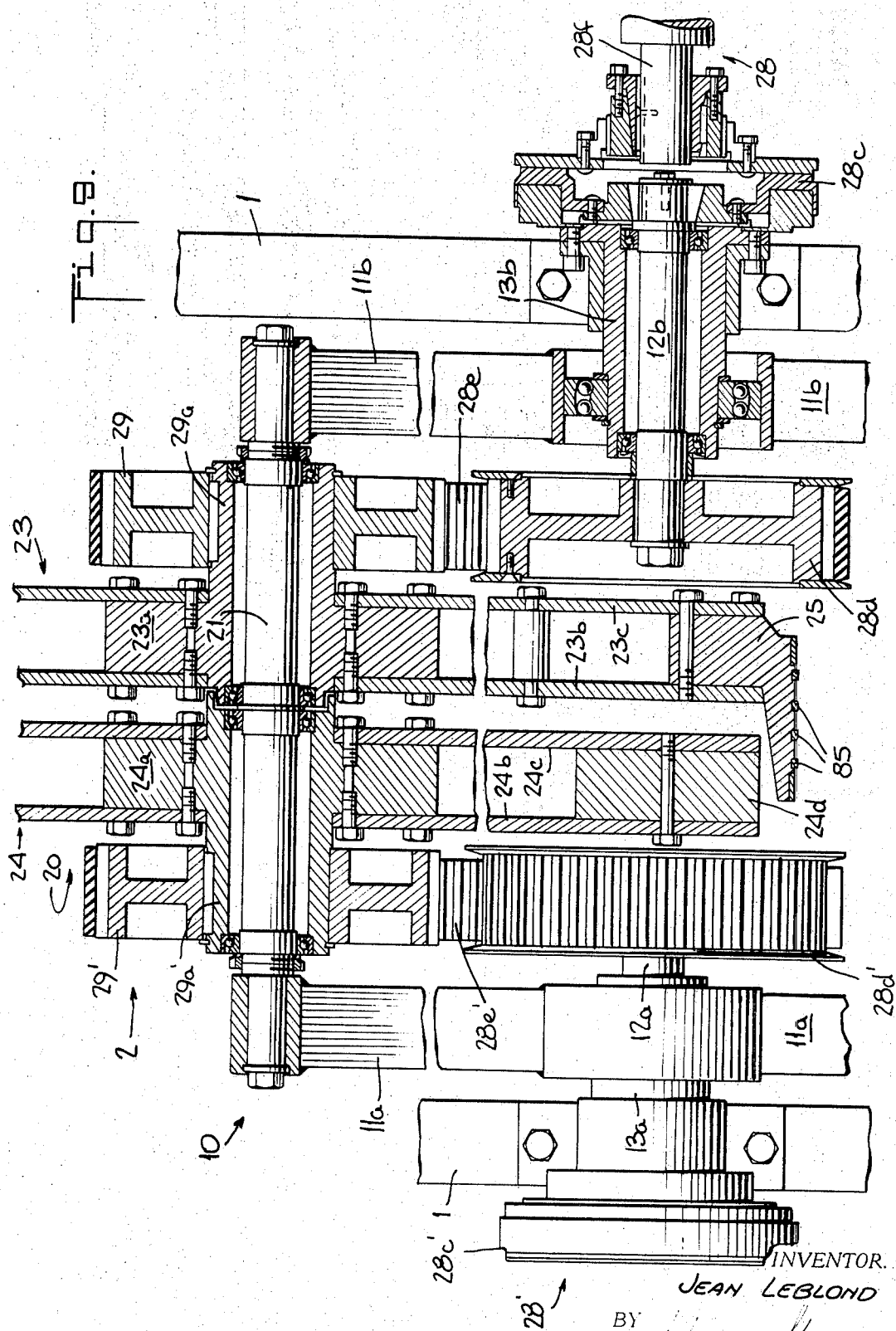

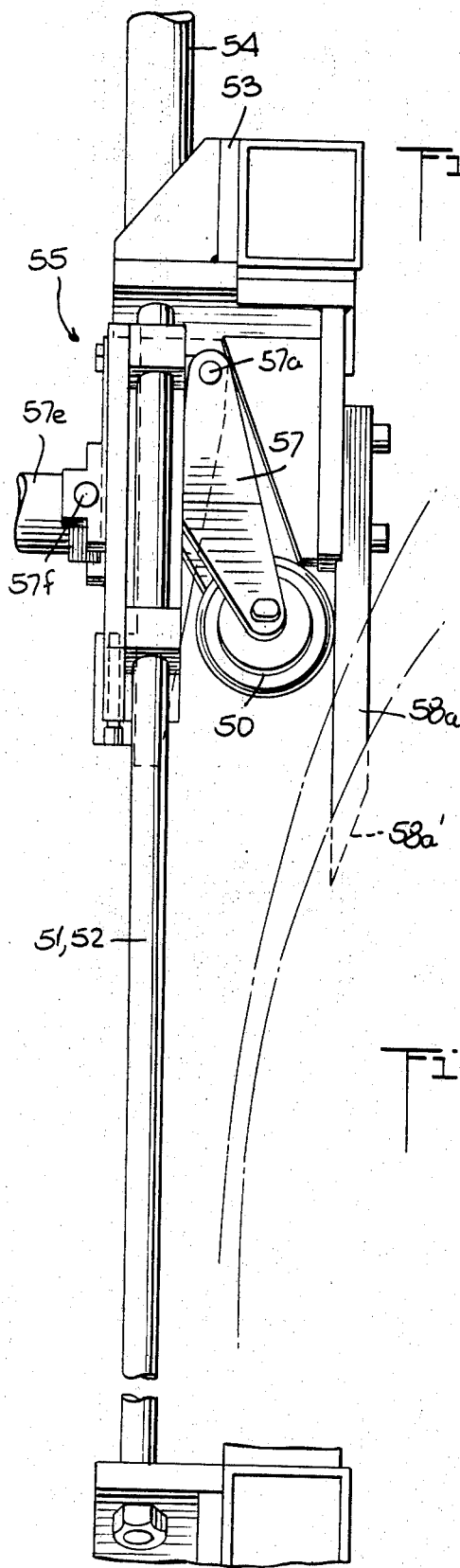
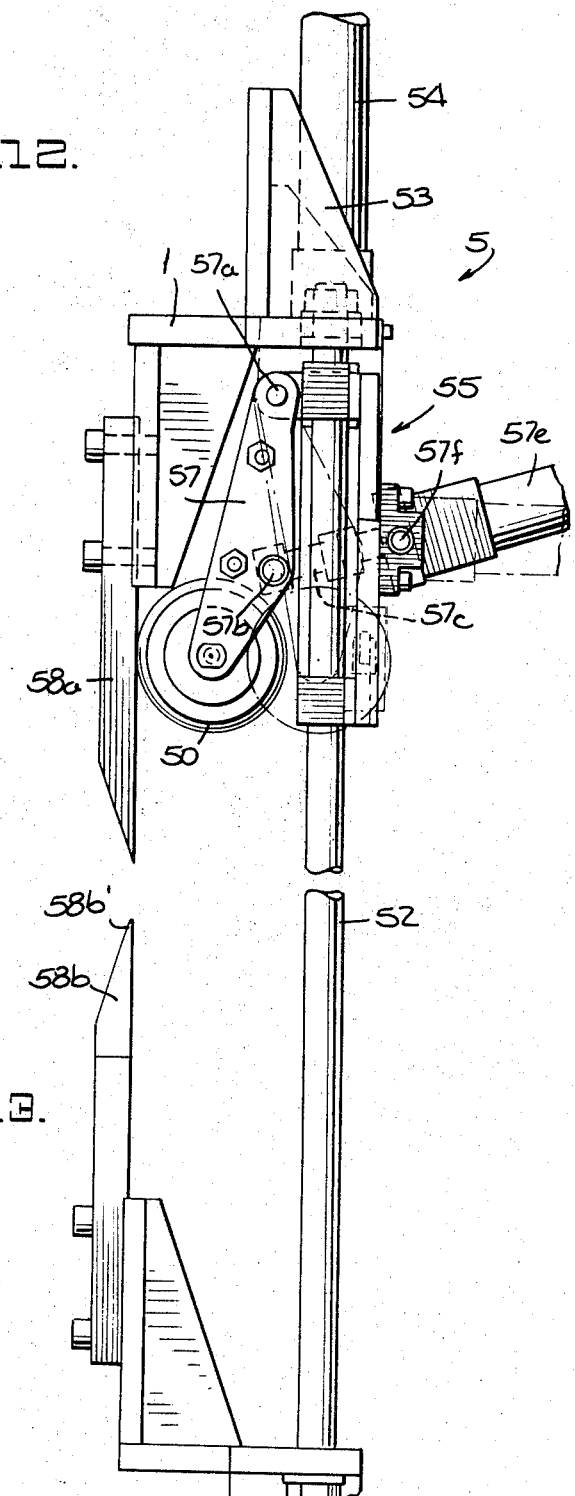
Fig. 12.
Fig. 13.
INVENTOR.
JEAN LEBLOND

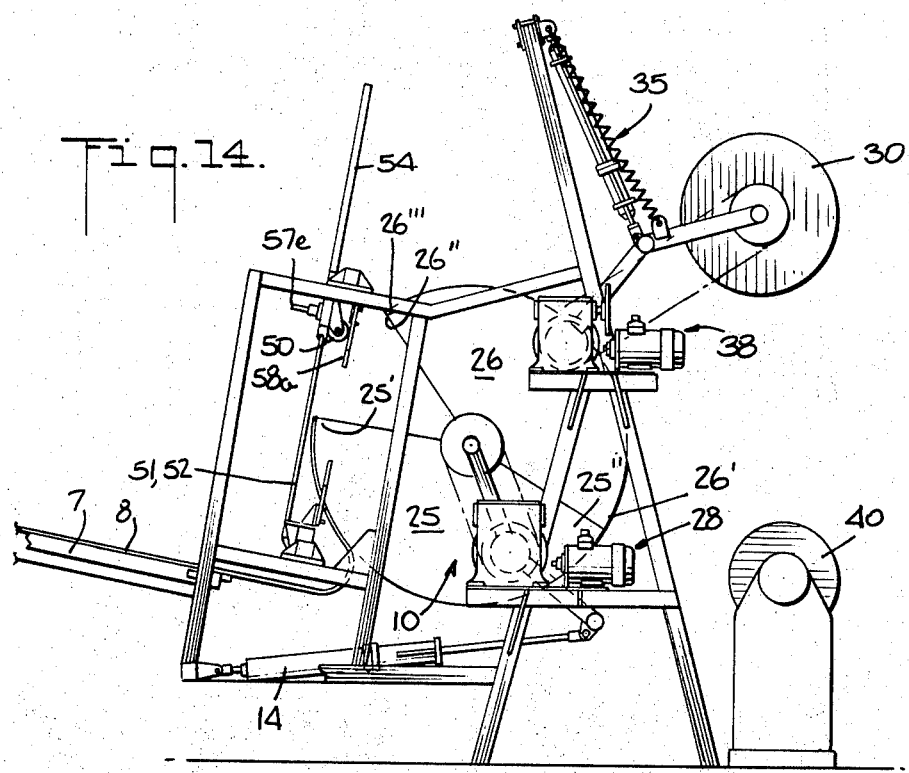
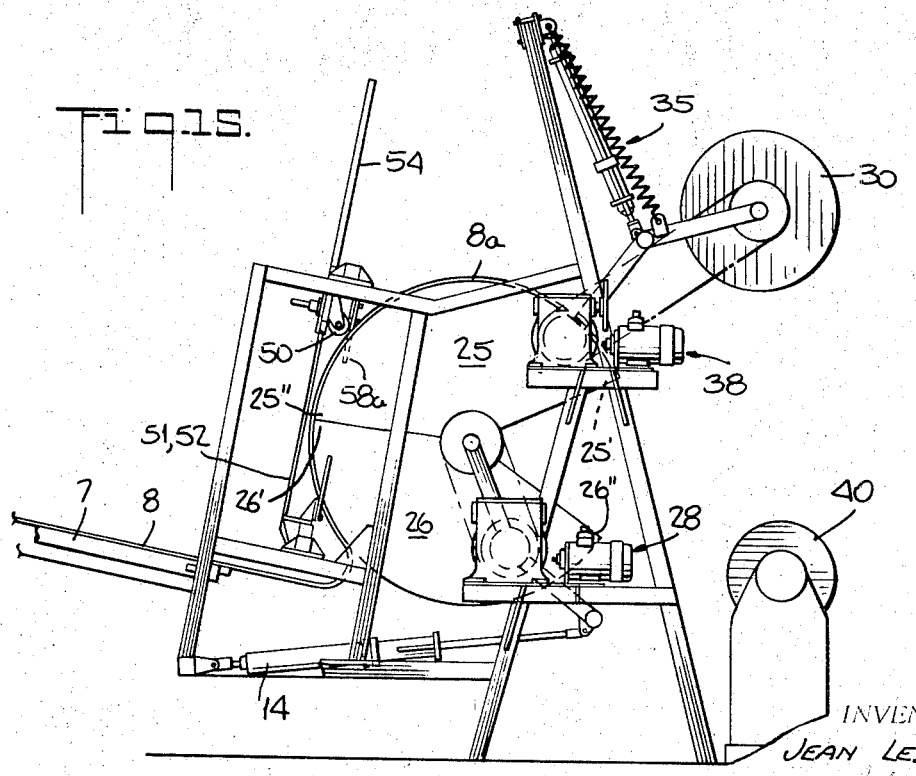

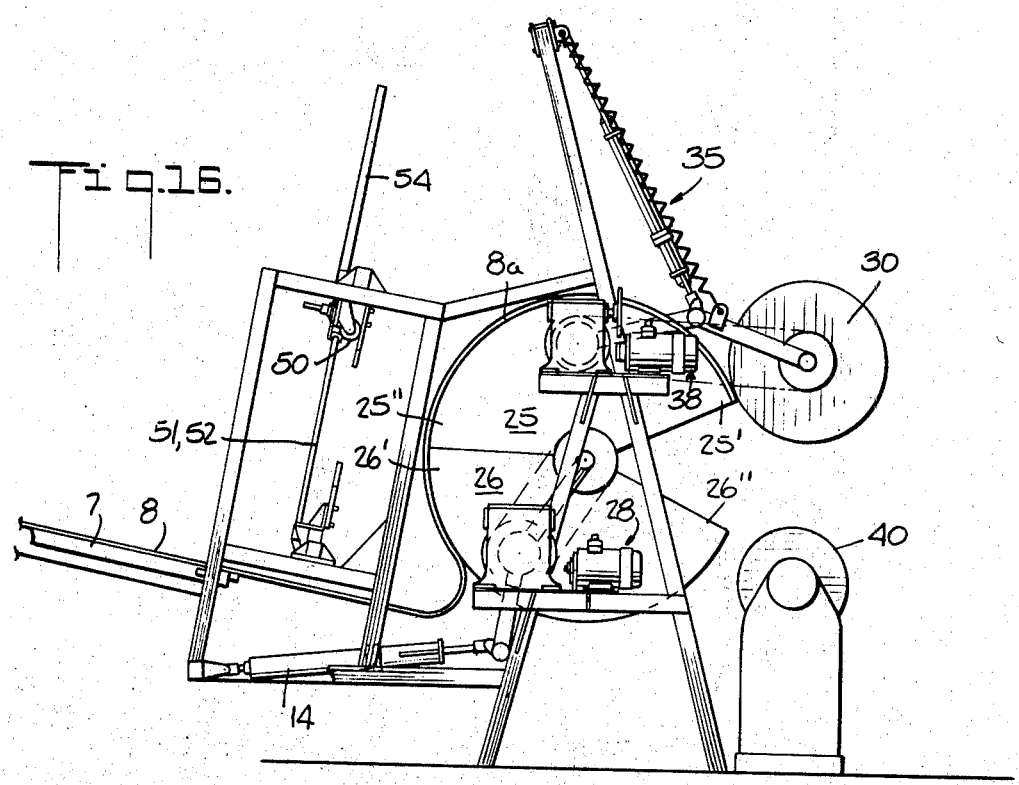
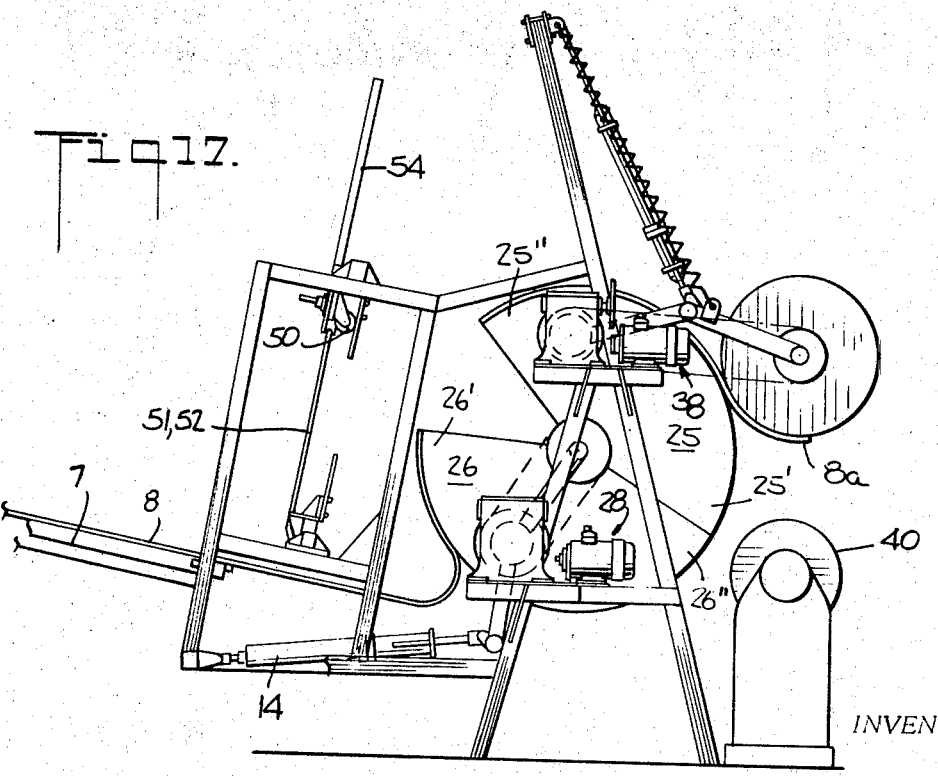

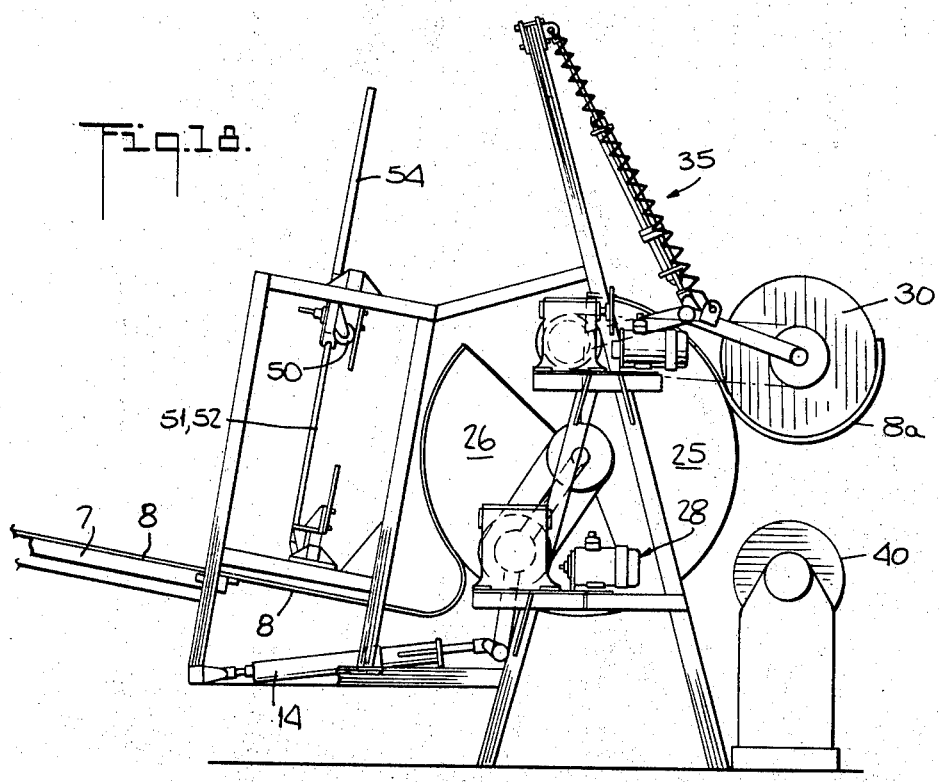
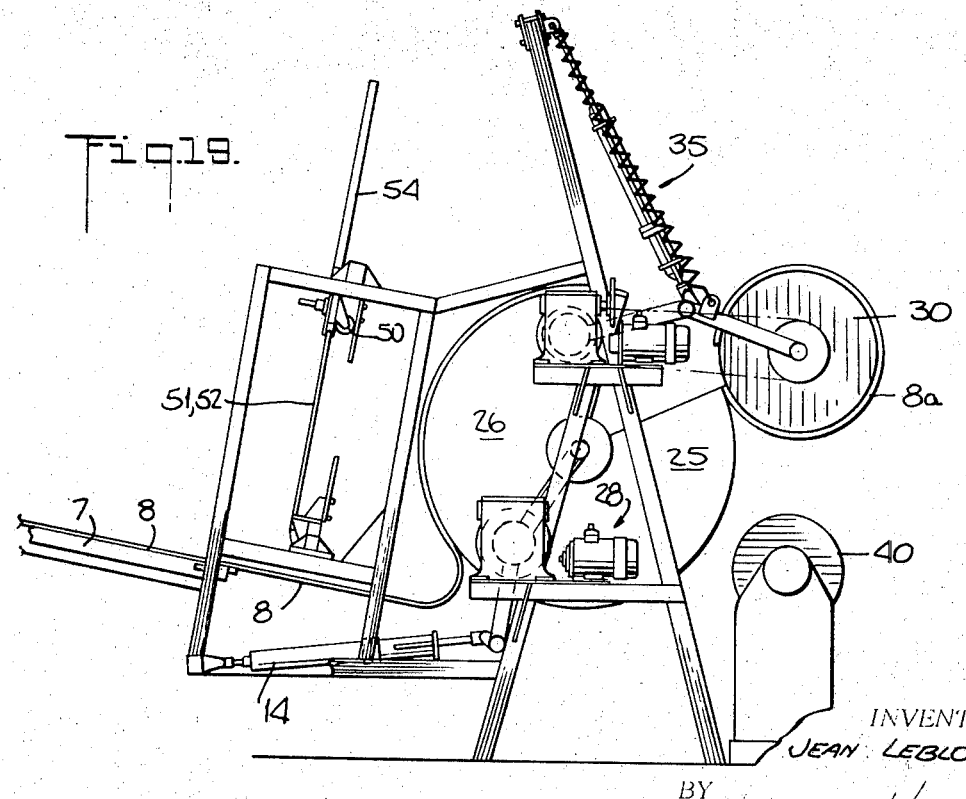

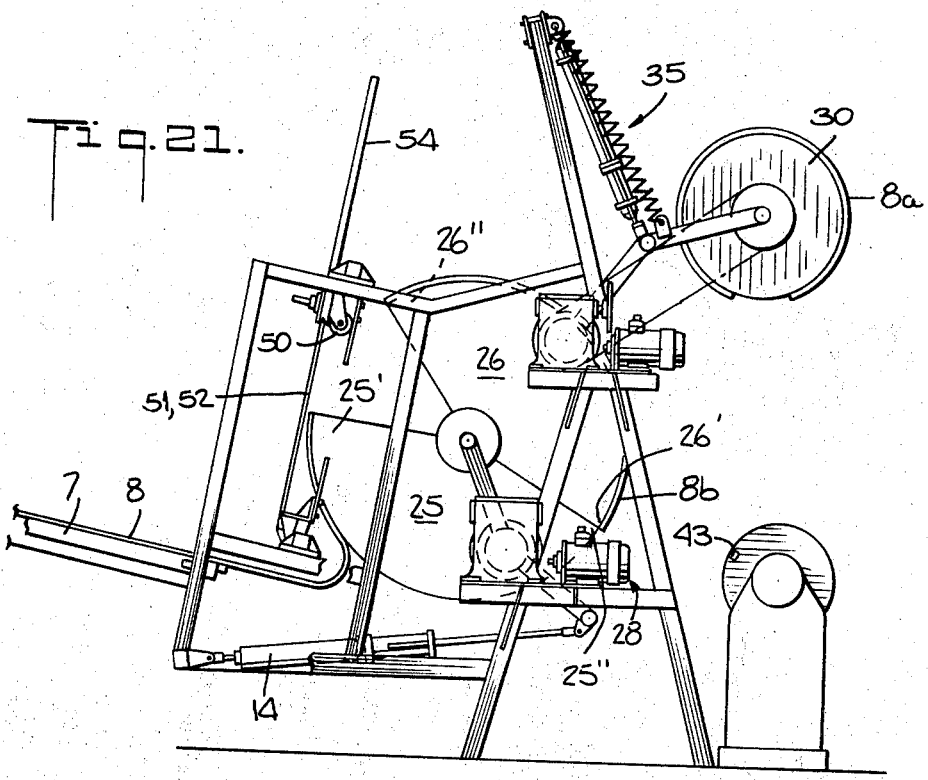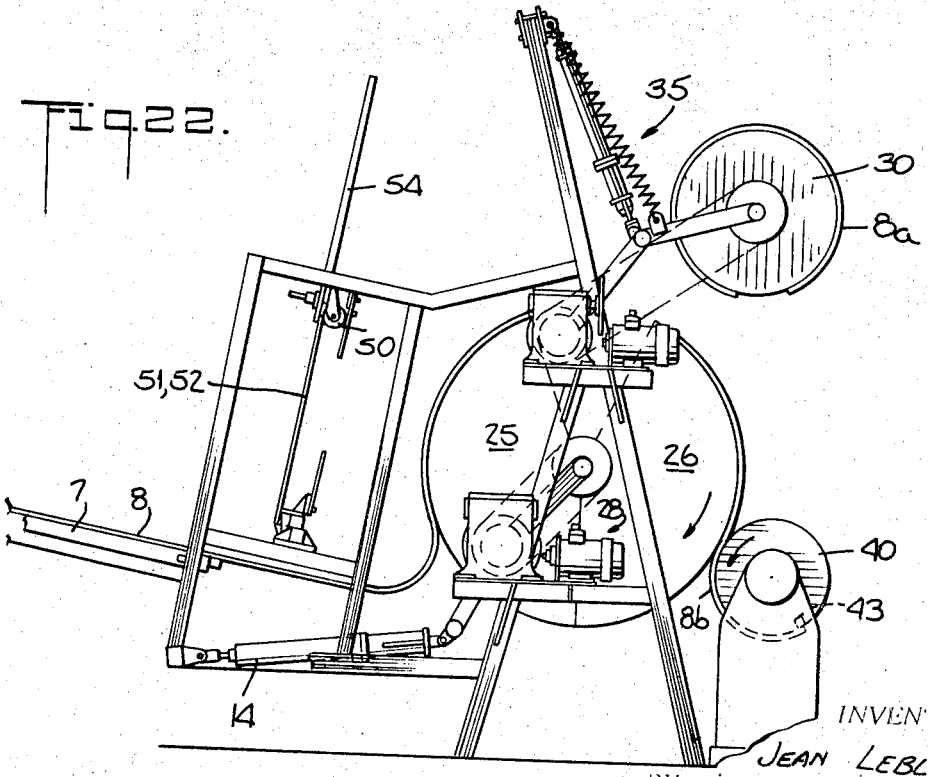

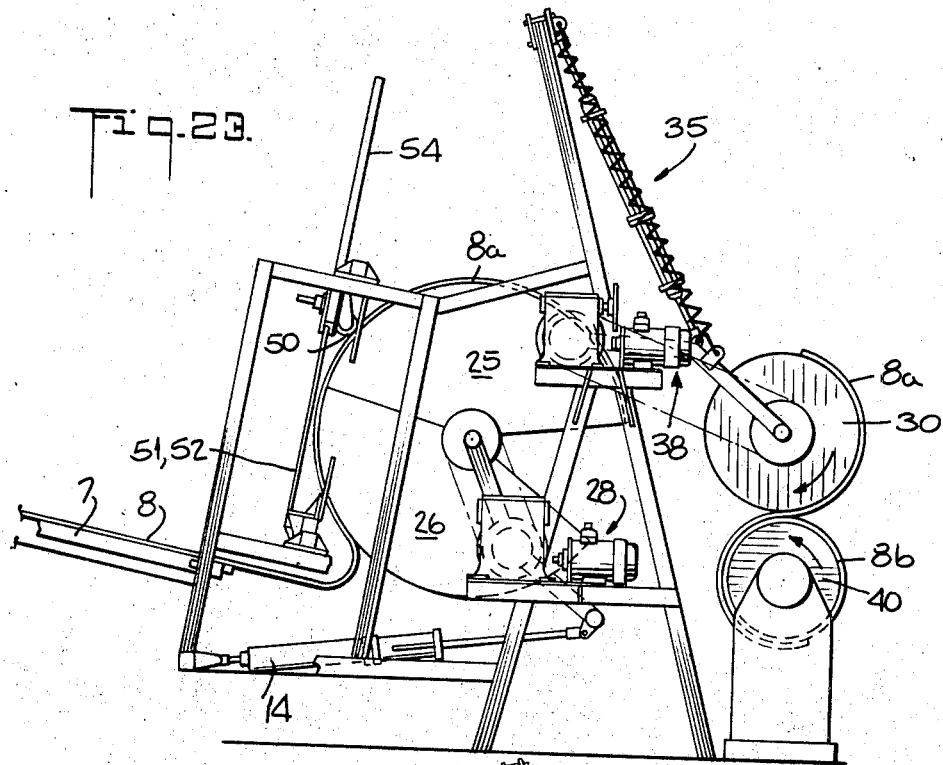
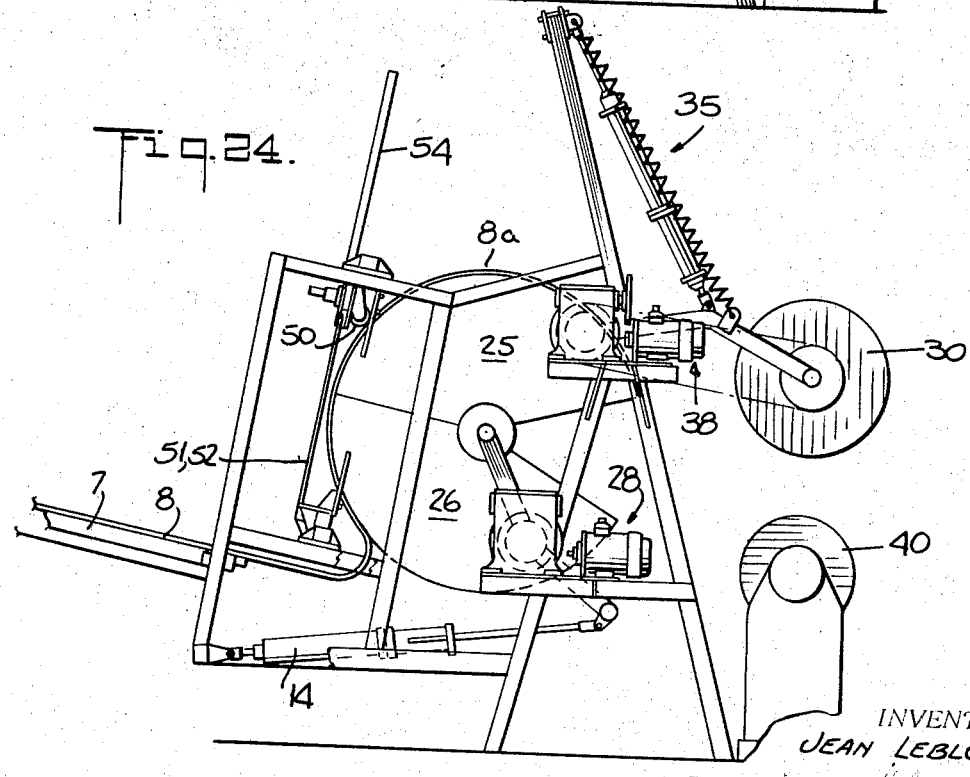

3,547,732
BREAKER BUILDING APPARATUS HAVING A SEVERING DRUM, A TRANSFER DRUM AND A BUILDING DRUM
Jean Leblond, Compiegne, Oise, France, assignor to Uniroyal Englebert France S.A., Paris, France, a corporation of France
Filed Aug. 2, 1968, Ser. No. 749,810
Claims priority, application France, Aug. 11, 1967, 117,824
Int. Cl. B29h 17/20
U.S. Cl. 156—405
48 Claims

ABSTRACT OF THE DISCLOSURE

A breaker building method and apparatus in which a continuous strip of breaker material, coming from a single source, is severed into strip portions on a main drum. Alternate ones of these strip portions are transferred directly from the main drum to a breaker building drum while the remaining ones of the strip portions are transferred first to an intermediate member and from there to the breaker building drum in such a manner that the cords of successive breaker plies on the breaker building drum form a crossing angle with each other.

---

This invention relates to an improved tire building apparatus and method and, more particularly, to an improved apparatus and method for producing multi-ply crown breakers for pneumatic tire carcasses from a continuous strip of breaker fabric.

BACKGROUND OF THE INVENTION

In the building of tires having breakers or belts incorporated in the crown area of the tire, as in the case of radial ply, belted tires for example, a two stage process is conventionally employed. During the first stage of building, a cylindrical carcass is formed having (1) one or more rubber covered cord plies wound around an interconnecting axially spaced, parallel, coaxial, bead cores and (2) a layer of rubber sidewall stock on each sidewall area of the carcass, intermediate the eventual crown area thereof and the two bead areas thereof. Such a carcass is referred to herein as the "first stage carcass." During the second stage of building, the shape of the first stage carcass is changed from a cylinder to a toroid and one or more rubber covered cord breaker plies and a rubber tread slab are added to the crown portion of the carcass to form what is referred to herein as the "scond stage carcass." The term "rubber" as used herein is intended to cover natural rubber, man-made rubber and rubbery materials. The term "cord" is used herein is intended to cover single and multiple strands, filaments, wires or cables of natural and synthetic textile materials such as cotton, rayon, nylon, polyester, glass fiber, and the like, metal and/or such other materials as may be used as reinforcements in pneumatic tires.

Crownbreaker plies have theretofore been applied by hand directly onto previously shaped and inflated first stage carcasses. Similarly, the different breaker plies have heretofore been assembled by hand onto a building drum and then transferred to a position surrounding a first stage carcass, the carcass thereafter being shaped and inflated to expand outwardly into contact with the breaker plies. In addition, various attempts have been made to mechanize the building of breakers on a building drum for subsequent transfer to a first stage carcass, these attempts generally utilizing principles taught in prior art carcass ply-to-building drum applicator devices, such as those shown in U.S. Pat. No. 1,938,787 to A. O. Abbot, Jr., which issued on Dec. 12, 1933, U.S. Pat. No. 3,071,179 to F. Tourtellotte et al., which issued on Jan. 1, 1963, and U.S. Pat. No. 3,157,542 to H. W. Trevaskis, which issued on Nov. 17, 1964.

Mechanized breaker building previously involved complex devices which were, for various reasons, neither completely satisfactory nor economical to use. In the building of crown breakers having one or more pairs of plies with crossed cords, for example, it was usually necessary, in order to mechanize the breaker building operation, to provide two separate sources of breaker strip material, with the cords in one source disposed oppositely relative to the cords in the other. This, in effect, required two separate breaker strip delivery and cutting systems to be utilized and required either the movement of the building drum between the two systems or the movement of the two systems alternately to the drum, increasing the chances for non-uniform tires to be built.

Other prior art breaker building systems have required complex pivotable conveyor mechanisms cooperating with a drum of sequentially alternating direction of rotation in order to mechanize the breaker building operation. Similarly, prior art mechanized breaker building systems have required complex, expensive vacuum systems to be employed as clamping or holding mechanisms to maintain the breaker strip material and breaker plies in proper position on the applicator devices.

Accordingly, the primary object of the present invention is to provide an improved tire building apparatus and method which overcomes the foregoing disadvantages.

Another object of this invention is to provide an improved tire building apparatus and method wherein crown breakers having one or more pairs of plies with crossed cords can be built from a single source of breaker strip material.

An additional object of this invention is to provide an improved tire building apparatus and method in which breaker strip material and breaker plies can be clamped to the applicator device in a facile manner.

Further objects and advantages of this invention will become apparent as the following description proceeds.

SUMMARY OF THE INVENTION

Briefly stated, and in accordance with one embodiment of this invention, there is provided apparatus for building annular breakers from a continuous strip of breaker material, comprising a rotatable building drum, a pair of segmental portions of a common cylinder rotatable about a common axis and adapted to support the end portion of the continuous strip, means spaced from the drum for severing portions of said continuous strip on said segmental portions, means for moving the common cylinder between a position adjacent to said severing means, an intermediate position and a position tangentially contacting said drum, a rotatable transfer drum, means for moving the transfer drum between a position remote from said building drum, an intermediate position tangentially contact said common cylinder when the latter is in its intermediate position, and a position tangentially contacting said building drum when said common cylinder is positioned adjacent to said severing means, alternate ones of said severed portions of strip material being applied to said building drum directly by said segmental portions of said common cylinder, the remaining ones of said severed portions of strip material being applied first to said transfer drum by said segmental portions and then being applied by said transfer drum to said building drum, whereby pairs of breaker plies are built up on said building drum with the cords of one ply in each pair forming a crossing angle to the cords of the second ply in each pair.

A process of making breakers in accordance with one embodiment of this invention, comprises the steps of winding on one of a pair of segmental portions of a common cylinder a length of strip material which is equal to the length of the outer breaker ply; transferring said length of strip material from said one segmental portion onto an intermediate drum rotating in a direction opposite to that of the common cylinder, the outer face of the strip material being in contact with the said intermediate drum; winding a second length of strip material onto the other of said pair of segmented portions; transferring this second length of strip material directly from said other segmental portion onto a building drum, the outer face of said second strip being in contact with the said building drum; placing the intermediate and building drums into tangential contact; and transferring from said intermediate to said building drum the said first strip previously wound on the intermediate transfer drum, the initially inner face of this first strip being in contact with the initially inner face of the strip already wound up on the breaker building drum, whereby pairs of breaker plies are built upon said building drum with the cords of one ply in each pair of forming a crossing angle to the cords of the second ply in each pair.

While the specification concludes with claims particularly pointing out and distinctly claiming the subject matter regarded as this invention, it is believed that the invention will be better understood from the following description taken in conjunction with the accompanying drawings in which:

FIG. 1 is a front elevation view of an improved tire building apparatus built in accordance with this invention;

FIG. 2 is a top-plan view of the apparatus shown in FIG. 1;

FIG. 3 is an enlarged elevational view of the main transfer drum;

FIG. 4 is a side elevational view of the main transfer drum shown in FIG. 3 taken along the line IV—IV of FIG. 3;

FIG. 5 is a transverse sectional view of the main transfer drum taken along the line V—V of FIG. 3;

FIG. 6 is an enlarged, partly sectional, view showing the detail of the locking arrangement between the segments of the main transfer drum taken along line VI—VI of FIG. 3;

FIG. 7 is a partial end view taken along line VII—VII of FIG. 3 showing one edge portion of one of the pair of segments comprising the main transfer drum;

FIG. 8 is a partial end view taken along line VIII—VIII of FIG. 3 showing the adjacent but spaced edge portion of the other of the pair of segments which is complimentary to and which is adapted to mate with the edge portion illustrated in FIG. 7;

FIG. 9 is an enlarged, partial, partly sectional view taken along line IX—IX of FIG. 1, showing in detail a part of the support and drive mechanism for the main transfer drum;

FIG. 12 is a front elevational view taken along line XII—XII of FIG. 11, showing the cutting mechanism;

FIG. 13 is a rear elevational view taken along line XIII—XIII of FIG. 11, showing the cutting mechanism;

FIGS. 14 through 25 are synoptic views of the machine of FIG. 1, showing the various elements of the machine in different relative positions of operation in connection with the building of an annular breaker from a continuous strip of bias-cut breaker material.

GENERAL DESCRIPTION OF MACHINE

Figure 25:
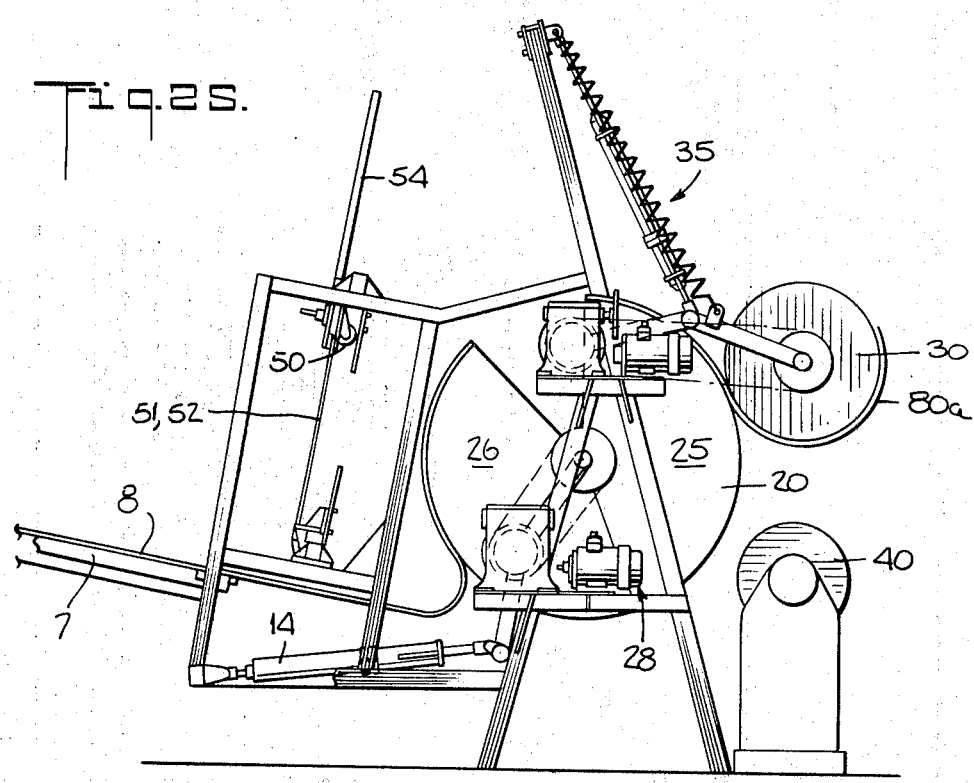

The machine according to one embodiment of the invention comprises a frame 1 (FIG. 1) rotatably and radially movably supporting a first drum means 2 thereon. A second drum means 3 is swivably connected to the frame 1 and is movable into and out of tangential contact with the drum means 2. A further rotatable drum means 4 comprises a breaker building drum 40 which is fixed in position with respect to frame 1 but which may be axially movable, for movement of a built-up breaker thereon, to the next work station.

Also supported on frame 1, spaced from the building drum 40, is a severing means 5 which preferably includes a rotary cutter 50.

A conveyor 7 transports a continuous strip of breaker material 8 from a supply roll (not shown) to the vicinity of drum means 2 which latter includes a drum 20. To begin the operation, an operator places the leading end of the continuous strip 8 onto the surface of drum 20. Magnet means 85 (FIG. 5), to be described in more detail below, are provided on the drum surface. The strip 8 includes magnetizable metallic cords and thus magnetically adheres to the surface of the drum 20, as a result of the attraction provided by the magnet means 85. The continuous strip material 8 is then wound on drum 20 and is intermittently severed thereon into strip portions 8a and 8b (FIG. 2) respectively corresponding in length to the outer and inner oven of a pair of breaker plies to be built on the building drum 40. Continued rotation of drum 20 carries these strip portion 8a and 8b into the vicinity of drum means 3 and 4 where alternate ones of the strip portions, namely the portion 8a of successive portions 8a, 8b, 8a, 8b, etc., are applied to the drum 30 of the drum means 3, in response to the latter swiveling on frame 1 into tangential contact with the drum 20 as will be described further hereinbelow. The remaining ones of the strip portions, i.e., the portion 8b, are applied directly by the drum 20 to the building drum 40, in response to the movement of the drum 20, as will be further described below, into tangential contact with the building drum 40.

Each of the drums 30 and 40 is, of course, also provided at its peripheral surface with magnetic means for withdrawing the respective strip portion 8a or 8b from the drum 20 and for securing the respective strip portions of the peripheral suface of drums 30 or 40, as the case may be.

The drum 30 is thus swivelable into tangential contact not only with the drum 20 but also during a later part of the cycle, with the building drum 40, for depositing on the latter (over the strip portion 8b previously applied directly by drum 20) the strip portion 8a meanwhile stored on drum 30. Thus, building drum 40 is rotated first by frictional engagement with drum 20 and thereafter by frictional engagement with drum 30. It will be seen that the direction of rotation of drum 40 is the same in both cases. A conveyor speed control means 71 (FIG. 1) including a dancer roll 72 located adjacent the path of the continuous strip 8, upstream of the drum means 2, is suitably connected in known manner to the drive conveyor 7 for controlling the speed with which the conveyor 7 advances the strip 8. As is known, the conveyor speed will be reduced with increased slack of strip 8 and will be increased when the slack decreases.

CONVEYOR AND FEED SYNCHRONIZING MECHANISM

The conveyor 7 feeding the continuous strip of breaker material 8 to the apparatus of the present invention is controlled by conventional drive means such as electric drive motor 70 whose speed is regulated by the control mechanism 71 (FIG. 1). This latter mechanism comprises essentially a roll 72 rotatably carried at the end of a crank 73 which is pivotably supported at 74 on an arm 75 pivotally connected, in turn, to the bell-crank 11 of the drum mounting means 10 supporting drum 20 in the manner described below. The crank 73 thus moves together with the drum 20 whenever the latter is moved by bell-crank 11. The control mechanism 71 is thus maintained in a position which always corresponds to the position of main transfer drum 20. A link 76 is articulately connected at one end thereof to frame 1 (FIG. 1) and at the other end to the mid-region of L-shaped arm 75. The free leg of crank 73 controls an element such as the wiper of a potentiometer 77 whose winding may be fixed to the arm 75. It will be apparent that the dancer roll 72 will, in each position of the main transfer drum 20, swivel the crank 73 with respect to arm 75 in response to any increase or decrease in the tension, i.e., slack, of the continuous strip of breaker material 8 just upstream of drum 20. The potentiometer 77 controls, in conventional manner, the speed of conveyor drive motor 70, for maintaining the slack of the continuous strip 8, within a permissible range, irrespective of the movement of drum 20 between the various positions thereof as will be described below.

CUTTER ASSEMBLY

Figure 11:
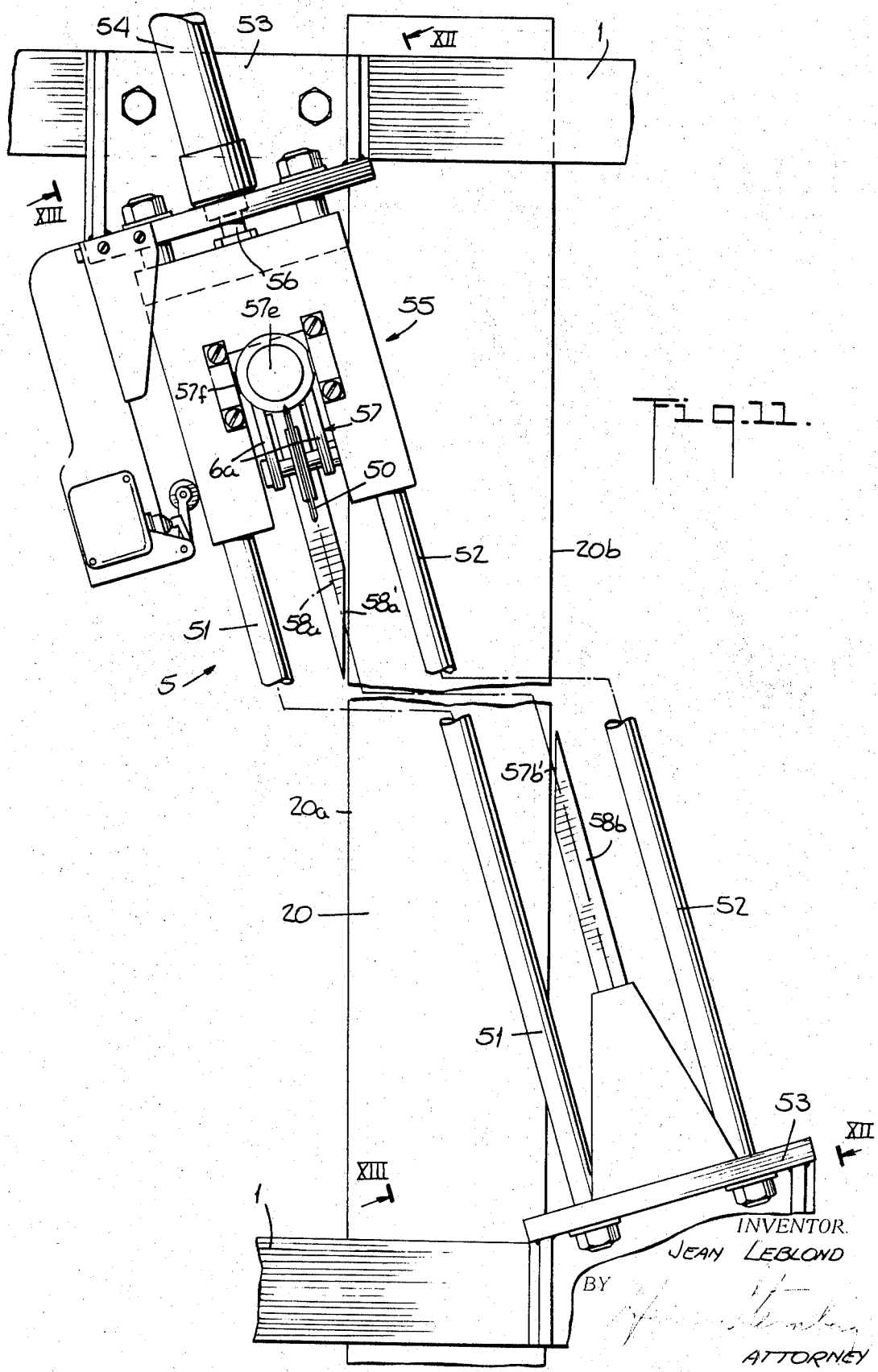
FIG. 11 is an enlarged, partial view taken along line XI—XI of FIG. 1, showing the cutting mechanism.
Figure 20:
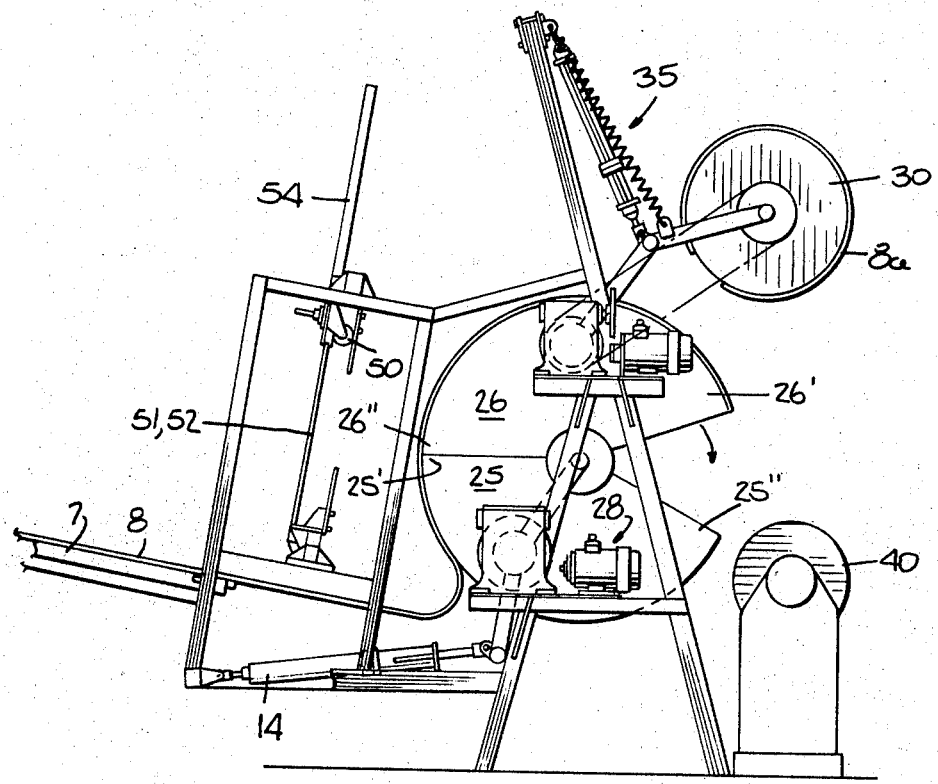

The cutter assembly or severing means 5 (FIG. 11) includes a pair of parallel guide rods 51 and 52, respectively rigidly fixed at their upper and lower ends by suitable means, such as bracket 53, to the frame 1, and inclined with respect to the median plane of the drum 20. A hydraulic or pneumatic cylinder 54, having a movable piston therein, is also fixed at one end thereof to the bracket 53 and extends in the direction away from but parallel to and centrally of the guide rods 51 and 52. A rotary cutter blade 50 is mounted on a movable carriage 55 adapted to be guided by and slidable along the parallel guide rods 51 and 52. The free end of the piston rod 56 of cylinder 54 is fixed to the carriage 55 for reciprocably moving the latter along the path defined by said guide rods.

The blade 50 is idly rotatably carried at one end of a pivotable arm 57 comprising a pair of parallel interconnected plates. Arm 57 is pivotally connected at its opposite end i.e., at pivot 57a (FIG. 12) to the carriage 55. The blade 50 is oriented centrally of and parallel to the guide rods 51 and 52 with its peripheral cutting edge lying substantially in the median plane between said guide rods. Articulately connected to the arm 57 at 57b (FIG. 13), i.e. intermediate the axis of blade 50 and the pivot 57a is the end of a piston rod 57c of a hydraulic or pneumatic cylinder 57e (FIGS. 12 and 13) whose axis is generally normal to the path of blade 50.

Suitable valves (not shown) are provided for actuating the hydraulic or pneumatic cylinder 54 so as to selectively move the carriage 55 between its upper-most position at the upper end of guide rods 51 and 52 (FIGS. 12 and 13) and its lowermost position (not shown) at the lower end of guide rods 51 and 52. In order to permit the cutter support arm 57 to pivot between the full line and chain line positions thereof respectively illustrated in FIG. 13, the cylinder 57e is itself articulately connected at 57f to the carriage 55. It will be seen that by maintaining the pressure fluid in the cylinder 57e at a constant pressure, by conventional means, the latter will uniformly urge the cutter 50 toward the surface of drum 20 so that the cutter will exert a uniform pressure while traversing its non-linear cutting path along the surface of drum 20. At the uppermost and lowermost end regions of the severing means 5, at opposite sides of the drum 20, there are located fixed guide rails 58a and 58b, respectively, (FIG. 13) on which the cutting edge of the cutter 50 rests when the carriage 55 is in the corresponding end positions. The guide rods 51 and 52 are symmetrical to but, as previously noted, inclined with respect to the equatorial plane of the drum 20. Furthermore, the drum 20 is movable laterally into and out of a cutting position (FIG. 14) in which the periphery of said drum is located adjacent the path of cutter 50. The blade guide rails 58a and 58b are fixed to frame 1 and extend toward and into close proximity of the opposite side edges 20a, 20b (FIG. 11) of the drum 20 when the latter is in said cutting position (FIG. 14). These free ends of the guide rails 58a and 58b have inclined surfaces 58a' and 58b', respectively, which are parallel to and closely adjacent the said opposite side edges of the drum 20 when the latter is in said cutting position so that the rotary blade 50 will, in traversing its cutting path, roll directly from the respective guide rail onto the peripheral surface of the drum 20 and thence continue to move on such peripheral surface along its inclined path (FIG. 11) and off the peripheral drum surface, at the opposite side edge of drum 20, directly onto the opposite blade guide rail located there. It will be understood that in traversing such inclined path along the cylindrical drum surface, the blade 50 traverses a non-linear path as explained above. It is for the purpose of maintaining a uniform cutting pressure along this non-linear path that cylinder 57e and its associated parts are provided. The inclination of the path of blade 50 with respect to the equatorial plane of drum 20 is chosen such as to correspond to the bias-angle of the cords in the breaker fabric strip 8. Severing of the breaker fabric strip 8 is thus accomplished on the drum 20 intermediate of and in parallelism with a pair of adjacent cords of the fabric strip.

POSITIONING MECHANISM

The main transfer drum 20 is movable from an intermediate position illustrated in FIGS. 16–20 to either of the end position illustrated in FIGS. 14 and 22, respectively. These end positions correspond respectively to a rear position, i.e., the severing position in which the drum 20 is adjacent the cutting mechanism 5 (FIG. 14), and a forward position in which the drum 20 is in tangential contact with the axially parallel breaker building drum 40 (FIG. 22).

In order to move the drum 20 between the aforesaid end positions and the intermediate position thereof, the shaft 21, which coaxially rotatably supports the main transfer drum 20, is journalled at opposite ends thereof in the corresponding end portions of a pair of parallel bell-cranks 11a and 11b (FIG. 9) of a drum mounting means 10. The bell-cranks 11a and 11b are, in turn, pivotable about a common axis namely the common axis of a pair of spaced coaxial sleeves 13a and 13b rigidly secured to frame 1. The opposite ends of the bell-cranks 11a and 11b are connected by a suitable cross rod 14a (FIG. 1) fixed to the free ends thereof. The piston rod 14b of a hydraulic cylinder 14 (FIG. 1) is articulately connected to the cross rod 14a. In response to the admission of pressure fluid to the conventional cylinder 14 the piston rod 14b will in well known manner be caused to reciprocate, thereby pivoting the bell-cranks 11a, 11b about the aforesaid axis of coaxial sleeves 13a and 13b, with the result that the entire main transfer drum 20 is pivoted between the said three positions thereof about the common axis of said sleeves. The direction of such pivotal movement of drum 20 depending, of course, on the direction of the admission of pressure fluid to cylinder 14 through conventional control valves (not shown).

BREAKER BUILDING DRUM

The breaker building drum means 4 includes a drum 40 located adjacent the forward end position of the main transfer drum 20 so as to be tangentially contacted by the latter in said forward end position of drum 20 (FIG. 1). The breaker building drum 40 is rotatably supported on a support 41 for rotation about an axis 42 which is parallel to the axis of the main transfer drum 20 and of the intermediate drum 30. Drum 40, unlike the other two drums, is fixed with respect to the frame 1 and is movable only in the direction of its own axis, from the illustrated station adjacent drum 20 to the next work station (not shown). The breaker building drum means 4 may be in all respect identical to the breaker building drum described in U.S. patent application Ser. No. 717,786 filed on Apr. 1, 1968, with the exception that the breaker building drum 4, according to the present invention, includes on its periphery a permanent magnet member 43 displaying a sufficiently high localized magnetic strength to overcome the magnetic forces of attraction which the main drum 20 exerts on the leading corner of a breaker strip portion 8b disposed on the peripheral surface of drum 20. Thus, whenever the peripheral portion of breaker building drum 40 at which the permanent magnet 43 is located, tangentially contacts the leading corner of a breaker strip portion 8b on the drum 20, the permanent magnet 43 on drum 40 will act to peel the contacted leading corner portion of strip 8b from the surface of drum 20, thus initiating the transfer of such strip 8b from drum 20 onto drum 40. After the entire strip portion 8b has been wound onto drum 40 and drum 20 is pivoted toward its rear position and the drum 30 is moved into tangential contact with drum 40. The strip portion 8a previously wound on drum 30 is now transferred onto drum 40 over the first strip 8b already on drum 40. The transfer is accomplished by both the magnetic attraction of magnet means located in the region of the surface of drum 40 and the tackiness of the unvulcanized material of the contacting strips 8a and 8b.

It will be apparent that suitable interconnecting mechanisms and controls are provided for synchronizing the rotational position of drum 40 with respect to the rotational positions of drum 20 and 30, respectively.

INTERMEDIATE TRANSFER DRUM

The intermediate drum means 3 includes a drum 30 rotatably supported on a horizontally extending shaft 31 (FIG. 2). Shaft 31 is fixed at opposite ends thereof to the free ends of a pair of parallel links 32a and 32b respectively. The links 32a and 32b are pivotally carried on a pair of spaced coaxial sleeves 33a and 33b, respectively, fixed to the frame 1 at opposite sides of drum 20, so that the drum 30 may pivot about the common axis of said sleeves 33a and 33b (FIG. 2), with respect to frame 1 in much the same way that drum 20 pivots about the axis of sleeves 13a and 13b (FIG. 9). A shaft 34 is rotatably received in and extends through the sleeve 33b coaxially therewith. At the inner end of shaft 34, intermediate the link 32b and the adjacent side face of drum 20 there is fixed to the shaft 34 a toothed gear 34a which is integral with the shaft 34 in line with a second toothed gear 34b rigidly connected to the drum 30.

Sprockets 34a and 34b are connected in a well known manner by means of a timing belt or chain 34c (FIG. 1). A rigid upwardly extending portion 1a of frame 1 articulately supports one end of a dual hydraulic or pneumatic cylinder-piston assembly 35 comprising a pair of back-to-back connected cylinders 35a and 35b which are independently actuable by conventional means and which have pistons (not shown) and piston rods 35a' and 35b', respectively. A rod 35c rigidly connects the central regions of links 32a and 32b and has pivotally connected thereto the free end of piston rod 35b'. Activation of one or both of the cylinders 35a and 35b in directions to extend the respective piston rods outwardly thereof will thus cause the drum 30 to pivot on the fixed sleeves 33a and 33b, with respect to frame 1. Actuation of cylinder 35a alone results in pivoting of drum 30 into tangential contact with drum 20 (FIG. 16), while actuation of both cylinders 35a and 35b results in pivoting of drum 30 further into tangential contact with the breaker building drum 40 (FIG. 23). Drum 30 is thus movable between three positions, namely, a first position in which the drum 30 is spaced from both the transfer drum 20 and the breaker building drum 40 (FIG. 14), a second position in which the drum 30 is in tangential contact with the drum 20 when the latter is in its intermediate position (FIG. 16) and a third position in which the drum 30 is in tangential contact with the drum 40 (FIG. 22).

The outer peripheral surface of drum 30 comprises a plurality of circumferentially extending grooves 36 filled with magnetic elastomeric material, such as the barium ferrite loaded, magnetized, cured rubber described in U.S. Pat. No. 2,999,275 to W. S. Blume, Jr. The magnetic elastomeric material serves to attract the metallic cords of the breaker to the drum 30 to aid in maintaining the strip portion 8a on and in precise alignment with the drum 30. The circumference of drum 30 is chosen such as to exceed the length of the strip portions 8a which are severed from the continuous strip 8. The permanent magnet means 36, i.e., the magnetic strips located on the periphery of drum 30 exceed substantially in total magnetic strength, the permanent magnet means 85 to be later described in connection with drum 20, so that when the drums 20 and 30 are brought into tangential contact with one another a strip portion 8a located on the drum 20 and coming at one end thereof into engagement with the drum 30 will be transferred to the latter as a result of the greater magnetic strength exhibited by the magnet means 36 of the latter. The magnetic strength differential between the two drums may be achieved by for example, providing on drum 30 substantially more magnet strips or magnet strips of larger size or of higher strength than those provided on drum 20. An additional permanent magnet member, such as member 43 on drum 40 may be provided also (not shown) on drum 30 for facilitating the initiation of the breaker strip transfer from drum 20.

For returning the drum 30 to its upper rest position (FIG. 1) there is provided a bias means which may be in the form of a pair of coil springs 37a and 37b (FIG. 2) supported between the frame member 1a and the links 32 and 32b, respectively, for normally urging the links, and therewith the drum 30, upwardly out of contact with the drums 20 and 40 toward the upper rest position thereof. The force produced by actuation of the hydraulic or pneumatic cylinders 35a and/or 35b is of course sufficient to overcome the bias force of springs 37a and 37b.

A driving means 38 for rotating the drum 30 about its own axis 31 comprises, in addition to the sprockets 34a and 34b connected by a positive drive belt or chain 34a, an electric drive motor 38a suitably connected by means of a conventional chain drive 38b to a suitable reduction gear 38c and an electromagnetic clutch 38d of conventional design. The clutch 38d is positioned intermediate the reduction gear 38c and the shaft 34 which is integral with sprocket 34a, for selectively coupling and uncoupling the latter to drive motor 38a via the reduction gear 38c. Thus, the drum 30 may either be in driving connection with the electric drive motor 38a or may be free wheeling depending upon the condition of actuation of the electromagnetic clutch 38d.

MAIN TRANSFER DRUM

The main transfer drum 20 includes a pair of parallel adjacent wheels 23 and 24 (FIG. 9) having hubs 23a and 24a, respectively rotatably supported by conventional bearings on the common shaft 21, so as to be independently rotatable with respect to said shaft and with respect to each other. Each of the wheels 23 and 24 further includes a pair of axially spaced discs 23b, 23c and 24b, 24c, respectively connected to opposite sides of the respective hubs. Mounted on the pair of discs 23b, 23c of wheel 23 at the peripheral edge of the latter, is one segmental portion 25 of a pair of segmental portions of a common cylinder. Thus segment 25 has a cylindrical outer surface coaxial with the common shaft 21 and extending over a portion only of the periphery of said wheel 23. Similarly, wheel 24 comprises the other of said pair of segmental portions, namely segment 26 fixed to the peripheral edge of discs 24b, 24c so as to extend over a portion of the periphery of wheel 24. Each of said wheels preferably carries a counter-weight member, e.g., 23d and 24d, respectively, in the region of its periphery and preferably diametrically opposite the center of gravity of the respective segment member thereof. The segments 25 and 26 each have an inner mounting portion 25a and 26a, respectively, and an axially extending outer breaker support surface portion 25b and 26b respectively (FIG. 5). The outer portion 25b of segment 25 on wheel 23 extends axially toward and in overlapping relationship to the wheel 24 and is in circumferentially staggered relationship with the segment 26 of the wheel 24 (FIG. 3). The latter segment 26 has an outer portion 26b extending axially toward and in overlapping relationship with wheel 23. Thus each of the wheels has on part of its periphery a segment member having an outer breaker-support surface portion 25b, 26b which when developed in a plane, correspond in size and shape to the bias-cut fabric strips 8a and 8b, respectively.

Thus, each of the outer support surface portions of the segments 25, 26 when developed in a plane, corresponds in shape to a plane parallelogram-shaped figure whose longer sides are parallel to the equatorial plane of the finished tire and whose shorter sides are parallel to the wires or cords of the bias-cut fabric ply. Furthermore, each of the segments 25, 26 has a support surface equal in width to the respective strip portion or ply 8a, 8b to be carried or transferred on the drum 20, with one segment, namely sector 25 having a cylindrical surface portion 25b whose length corresponds to the length of the outer ply 8a of the breaker to be built on drum 40 while other segment, namely segment 26 has a cylindrical surface portion 26b whose length corresponds to the length of the inner ply 8b of the breaker to be built on drum 40. The circumference of the discs 23 and 24 exceeds the sum of the lengths of the surfaces 25b and 26b of segments 25 and 26 so that the segments are rotationally displaceable with respect to each other. FIGS. 14–25 show the segments 25 and 26 diagrammatically, in the different positions of the latter. Adjacent edges, e.g., edges 25″ and 26′ of the pair of segments are inclined at the same angle with respect to the equatorial plane of the pair of wheels 23 and 24. The segments, therefore, are arranged in such a manner that when by the roation of one of the two wheels 23 or 24, one end of one segment comes in contact with the adjacent end of the other segment, the two segments 25 and 26 combine to form a single continuous segment of uniform width and whose ends terminate substantially in a pair of points as shown in FIGS. 7 and 8. One of these segments, namely segment 25 is intended to receive the outer ply 8a of the breaker, while the other segment namely segment 26 is intended to receive the inner ply 8b of the breaker. When the segments 25 and 26 are jointed together, either at one adjacent pair of oblique ends or at the other, the two wheels 23 and 24 are made integral with one another by means of a permanent magnet means 87 (FIG. 6) disposed entirely in the space between the wheels 23 and 24 and including a pair of magnetizeable stop members 23′ and 23″ (FIG. 3) angularly spaced on and fixed to the inner disc of wheel 23 and adapted to be magnetically engaged respectively, by a corresponding one of a pair of circumferentially oppositely facing closely adjacent permanent magnet members 24′ and 24″ respectively fixed to the inner disc of wheel 24 and disposed in said space between said stop members.

The wheels 23 and 24 may be relatively angularly shifted between a pair of end positions in one of which the edges 25′ and 26″ of segments 25 and 26, respectively, are in engagement (FIG. 4), and in the other of which the opposite edges, i.e., 25″ and 26′ are in engagement.

The angular spacing of the magnetizable blocks 23′, 23″ is such that in said one end position of the wheels, the permanent magnet 24′ coacts with the magnetizable block 23′ (FIG. 6) to releasably i.e., magnetically lock the sectors 25, 26 in the position illustrated in FIGS. 3 and 4, i.e., with their edges 25′, 26″ in contact with each other. The magnet means 87 thus acts to insure an integral connection of the two wheels 23, 24 when they are in such shifted end position so that there is no discontinuity from the segment surface 25b to the segment surface 26b, i.e., so that there is no discontinuity between the segments at the interface of the edges 25′ and 26″. When, on the other hand, the segments are in their opposite end position as illustrated in FIG. 17, then permanent magnet 24″ on wheel 24 coacts with the magnetizable block 23″ on wheel 23. The magnetic attraction between these members then releasably locks the wheels 23, 24 together in the position shown in FIG. 17 with a surface continuity between the respective segments at the edges 25″, 26′. At the end of each segment there is affixed a hardened steel strip 25‴, 26‴ (FIG. 4), respectively, which forms a cutting surface, such that in either of the aforesaid end positions of the segments there will be a hardened strip located adjacent the interface between the segments and providing a flush, hard, cutting surface conforming generally to the cylindrical curvature of the surface of the pair of segments.

Each of the segments is further provided with a plurality of circumferentially extending grooves which are in number smaller than the number of similar grooves on the drum 30 and which are filled with permanently magnetic elastomeric material 85 such as previously described.

Figure 10:
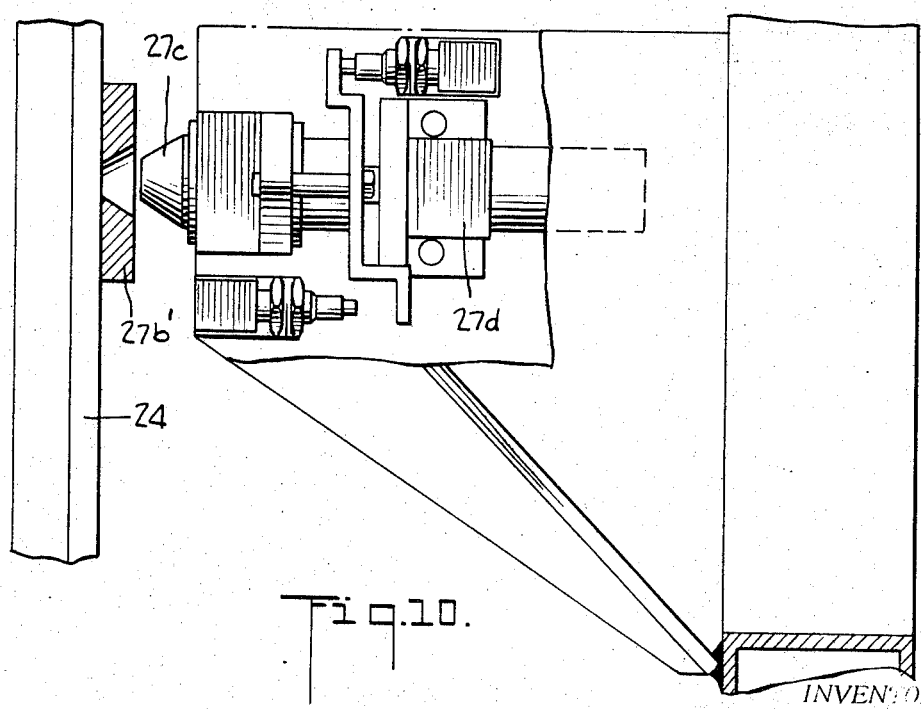
FIG. 10 is an enlarged, partly section view, taken along line X—X of FIG. 1, showing one of a pair of identical locking mechanisms for the main support drum, the latter being shown in its rear position for illustrative purposes.

In addition, the sector wheels 23, 24 are provided, in appropriate angularly spaced locations thereon with a plurality of outwardly open conical recesses. These may be provided on plates 27a′ and 27b′ exteriorly mounted on said wheels. The conical recesses of these plates 27a′, 27b′ are adapted to be engaged by correspondingly conical, solenoid or hydraulically operated, plunger members 27c, 27c′, (FIG. 10) which, together with said recessed members constitute a locking means for locking the wheels 23, 24 in predetermined angular positions with respect to frame 1 so as to facilitate the cutting operation by assuring a proper positioning of the segments during the cutting stroke. The solenoids 27d, 27d′ or other suitable locking devices are fixed to the frame 1 in appropriate positions to engage with the corresponding conically recessed members 27a′, 27b′ for locking the corresponding wheel, preparatory to and during the cutting stroke, in the appropriate angular position thereof.

It will be apparent that with the connection provided by the permanent magnet means 24′, 24″ and the magnetizable blocks 23′, 23″, coacting therewith, driving of one of the wheels 23, 24, in a given direction of rotation while the other of said wheels is permitted to "free-wheel," i.e. has its electromagnetic clutch disengaged, will result in both wheels 23, 24 moving in said given direction as a single unit. Similarly, driving of either wheel in the opposite direction with the other wheel permitted to "free-wheel," i.e., having its corresponding electromagnetic clutch disengaged, will result in unitary rotation of both wheels in said opposite direction of rotation.

Rotation of the drum 20, i.e., of both wheels 23 and 24 in unison, or relative rotation of the wheels 23 and 24 with respect to each other for shifting the sectors 25 and 26 with respect to each other angularly, is accomplished as follows:

A pair of drive means 28 and 28′ are located at opposite sides of the drum 20 (FIG. 2). These drive means are identical in construction with respect to each other. Furthermore they are generally similar in construction with the drive means 38 so that only a brief description of one of the drive means 28, 28′ will suffice. Drive means 28, for example, includes an electric drive motor 28a fixed to frame 1 at one side of the drum 20. Motor 28a (FIG. 1) is connected via a suitable transmission mechanism 28b, a speed reducer 28g having an output shaft 28f, and an electromagnetic clutch 28c (FIG. 9), to the shaft 12b which is rotatably supported in sleeve 13b and carries at the end thereof spaced from the clutch 28c a suitable gear 28d. Gear 28d connected by a conventional timing belt 28e, or other suitable positive drive device, to a gear 29 rigidly fixed to a sleeve 29a which is integral with hub 23a of the wheel 23 for driving the wheel 23 in response to actuation of motor 28a whenever clutch 28c is in engaged condition to provide a driving connection between the shafts 12b and 28f. It will be seen that wheel 23 is free-wheeling whenever clutch 28c is in disengaged condition. Similarly, wheel 24 is freewheeling whenever clutch 28c' is disengaged so as to disconnect wheel 24 from its corresponding speed reducer output shaft 28f'.

OPERATION

The operating cycle of the apparatus, which is assumed to start when the leading end of a new strip 8 is first introduced into the apparatus, is as follows: With all the elements in the FIG. 14 position but with the segments 25 and 26 (shown diagrammatically in FIGS. 14–25) assumed to be in the rotational positions illustrated in FIG. 20, i.e., with the segment 26 (the shorter sector) in the position illustrated in FIG. 20, so that its edge 26″ is in engagement with the adjacent edge 25′ of segment 25. The plate 26′″ located at edge 26″ is therefore in registry with the cutting path of cutter 50. The solenoid 27d' is now placed in locking condition with its plunger 27c' in engagement with the corresponding conical opening provided therefore in the wheel 23 for locking the segment 25 in the illustrated angular position. The intermediate drum 30 is at this time in its uppermost, rest position, as illustrated in FIG. 14. The leading edge of the strip 8 of breaker material, after being threaded by the operator under the dancer roll 72, is applied onto the surface of segment 25 in such a way that the said leading edge extends slightly beyond the edge 25′ of the latter segment. The severing means 5 is then actuated by admitting pressure fluid to cylinder 54. The leading edge of the material 8 is cut by the cutter 50 traversing its inclined cutting path along plate 26′″ located at edge 26″ so as to obtain an accurately cut breaker strip end. It will be seen that the hydraulic or pneumatic actuator 54 moves the cutter carriage 55 from its uppermost (FIG. 14) to its lowermost position. During this traverse, the circular blade 50, when leaving upper guide rail 58a severs the strip material 8 between two adjacent ply cords thereof and continues along its path between said ply cords guided by the guide rods 51, 52 and parallel to the edge 25′ of segment 25. It will be apparent that while traversing this inclined path along the generally cylindrical surface of segment 25 the cutter blade 50 follows an arcuate and not a linear path. The cutting plate 26′″ serves as a backing for the strip material during the cutting stroke having the same general surface contour as the remaining portions of segment 26 except that the cutting plate surface is smooth and continuous, i.e., not interrupted by the magnetic material 85 contained in the grooves present on the remaining portions of the segment surface. The fluid pressure means 57e maintains a constant pressure on the articulated blade carrier 57 throughout the entire non-linear route of cutter blade 50, so that the latter moves along its cutting path under the influence of a constant cutting pressure. The cutter blade 50 thus severs the continuous strip material 8 intermediate a pair of adjacent parallel cords thereof. The initially severed strip portion is then removed and the sequence of the cycles of the building of the breaker can begin.

The locking solenoid 27d' is then deenergized to release the sector 25. The electromagnetic clutch 28c is meanwhile maintained engaged and the segment 26, i.e. wheel 24, is rotated in clockwise direction (as viewed in FIGS. 14–25) by its drive means 28' whose clutch 28c' is at this time also in engaged condition and whose drive motor 28a' is energized for providing such clockwise rotation. Since rotation of the segment 25 is prevented by its clutch connection to its speed reducer mechanism, the driving force of segment 26 is sufficient to overcome the magnetic attraction between the segments provided by magnet means 87, and the segment 26 thus rotates with respect to segment 25 until the segment 26 reaches the position thereof illustrated in FIG. 14, in which edge 25″ engages edge 26′ of segment 26 and is magnetically locked thereto.

The clutch 28c of segment 25 is now disengaged so as to permit segment 26, during continued clockwise rotation thereof, to drive segment 25 in clockwise direction also, into the FIG. 15 position thereof.

The rotation of drum 20 about its axis, causes the application of the strip 8, by magnetic attraction, to the peripheral surface first of segment 25 and then a portion of segment 26 (FIG. 15). When the drum 20 has reached the position illustrated in FIG. 15, that is the position in which the now engaged edges 25″ and 26′ of the segments 25 and 26 are located in the path of cutter blade 50, drive motor 28a' is stopped and segment 26 is locked in position by actuation of solenoid 27d. The continuous strip 8, positioned on drum 20 is then severed in the same manner as described above, except that this time the cutter 50 moves in a direction from its lowermost to its uppermost position. A strip portion 8a (FIG. 15), which will become the outer ply of the breaker and which corresponds in size to and is located on the surface of segment 25, is thus severed from the continuous strip material. Strip portion 8a occupies the entire outer surface of segment 25 and adheres thereto by magnetic attraction.

With the elements of the apparatus still in the positions illustrated in FIG. 15 the intermediate drum 30 is moved, by actuation of cylinder 35a, from its upper end position (FIG. 15) into an intermediate position (FIG. 16) in readiness for tangentially contacting main transfer drum 20. Drive motor 38a is energized and through the corresponding electromagnetic clutch 38d, drives drum 30 about its axis 31 so as to place the latter drum into a predetermined rotational position for receiving the outer ply strip portion 8a from the segment 25. It will be noted that the solenoids 27d and 27d' are fixed to the frame 1 at opposite sides of the drum 20 in the region of the rearmost (FIG. 14) position of the latter, so as to be able to engage said drum, when the latter is in its rearmost position. In order to move drum 20 from its rearmost (FIG. 15) to its intermediate (FIG. 16) position, the solenoid 27d, then in locking engagement with the segment 26, is deactuated so as to release segment 26 for rotational movement and also to release the drum 20 for lateral movement to its intermediate position (FIG. 16). It will be apparent that this movement of the drum 20 is accomplished by actuation of the hydraulic actuator 14 in a direction to retract the piston rod 14a thereof so as to rotate the bell-cranks 11a, 11b about their common axis. As seen in FIG. 16, this movement of drum 20 causes the latter to come into tangential engagement with drum 30. At this time the electromagnetic clutch 38d in the drive means 38 of drum 30, is placed in disengaged condition so that the drum 30 is free to idle about its own axis of rotation, were it not for its frictional engagement with segment 25 of drum 20. With drive motor 28a' unenergized but with the clutch 28c' kept in engaged condition, whereby the speed reducer 28g' remains connected to the segment 26, thus effectively preventing rotation of the latter, drive motor 28a is energized for driving segment 25 in clockwise direction, as viewed in FIG. 16. This results in a relative rotational movement of driven segment 25 with respect to segment 26, until the leading edge 25′ of segment 25 engages the trailing edge 26″ of segment 26 (FIG. 17). There is thus achieved a separation of the edges 25″, 26′ of the two segments by the driving force of motor 28a overcoming the magnetic attraction between the magnet 24″ and the block 23″ resulting in a relative turning movement of the segment 25 with respect to the segment 26 until the parts achieve the position indicated in FIG. 17.

It will be noted that, as a result of the presence of intermediate drum 30 in contact with the periphery of drum 20 during the time of the aforesaid relative movement between the segments 25 and 26, and due to the fact that the magnetic force of attraction of the magnet means provided on the surface of drum 30 substantially exceeds that of the magnet means 85 on the surface of the drum 20, the severed strip portion 8a will be transferred from the segment 25 onto the drum 30. The latter drum being frictionally rotated by drum 20. Once the leading edge of segment 25 comes into engagement with the trailing edge of segment 26 the permanent magnet member 24″ will be in engagement with and magnetically attracted to the block 23′ so as to magnetically hold the segments 25 and 26 in the relative position seen in FIG. 17. Thereafter the electromagnetic clutch 28c′ of segment 26, is disengaged, and the segment 26 is free to be driven by segment 25 in clockwise direction in response to continued rotation of the latter segment. During this continued rotation, the rest of strip portion 8a is wound onto the frictionally rotated drum 30, while an additional length of continuous strip 8 is simultaneously automatically applied to the segment 26 (FIG. 18). It should be noted that what was the underside of strip portion 8a on drum 20 now faces outwardly on drum 30.

When the entire strip portion 8a has been applied to the drum 30 (FIG. 19) the hydraulic or pneumatic actuator 35a is deactuated and the drum 30 moves upwardly into its rest position under the influence of spring means 37a, 37b. In this upper rest position of drum 30 the drive means 38 of drum 30 is energized and the electromagnetic coupling means 38d is engaged to drive the drum 30 through a predetermined angle of rotation about its own axis 31, for properly angularly orienting the strip portion 8a thereon preparatory to transfer of said strip portion onto the breaker building drum 40, as will be described hereinbelow.

Meanwhile, clockwise rotation of the drum 20 is continued, i.e., segment 25 continues to drive segment 26 clockwise until the trailing edge 26″ of segment 26 and the leading edge 25′ of segment 25, in engagement therewith, are in the predetermined position (FIG. 20) relative to the severing means 5. The drum 20 is then once more brought back into its rearmost, cutting position, by actuation of actuator 14, so that now the junction 26″, 25′ between the segments 25 and 26 is in registry with the cutting path of rotary cutter 50. The segment 25 is now locked in position by actuation of the solenoid 27d′. The cutter 50 which is at this time in its uppermost position, is moved towward its lowermost position by actuation of the actuator 54 resulting in severing of the strip portion 8b on segment 26 from the continuous strip material 8. The solenoid 27d′ is now deactuated. Segment 26 is now rotated in clockwise direction with respect to segment 25, in the manner described above, to the FIG. 21 position thereof. To accomplish the latter, with clutch 28c engaged so as to prevent rotation of segment 25 the drive means 28′ is actuated and through engaged clutch 28c′ drives the segment 26 in clockwise direction to overcome the magnetic attraction holding the edges 26″ and 25′ of the two segments together, and thereafter drives segment 26 clockwise until the leading edge 26′ thereof engages the trailing edge 25″ of segment 25 (FIG. 21) whereupon the rotational movement of segment 26 is stopped. The drum 20 is then moved through its intermediate position into its forward position (FIG. 22) by a suitable actuation of actuator 14 connected to the pair of bell-cranks 11a and 11b. It will be apparent that in this forward position of drum 20 the latter is in tangential peripheral engagement with the laterally-fixed breaker building drum 40.

Before drum 20 engages the drum 40, the latter of course, has been rotated into proper rotational position with respect to drum 20, i.e., to an angular position in which the permanent magnet 43 is in registry with the leading edge of the strip portion 8b on segment 26. Then the drum 40 is disengaged from its own drive motor by a suitable electromagnetic clutch (not shown) and is thus freewheeling.

The strip portion 8b on segment 26 is now applied, as a result of continued rotation of drum 20, onto the periphery of breaker building drum 40, as seen in FIG. 22. Drum 20 rotates in clockwise direction in response to continued driving of segment 26 by drive means 28′. The leading edge of the inner ply strip 8b is initially applied to drum 40 after being attracted by the permanent magnet member 43 located on the peripheral surface of drum 40. Clockwise rotation of the segment 26 is continued until the entire strip portion 8b has been applied to the freewheeling drum 40, the drum 20 frictionally driving building drum 40 during such application. It will be apparent that what was previously the underside of the strip portion 8b (on segment 26) now becomes the exterior surface of such strip portion when the latter is applied to the building drum 40. Meanwhile, segment 25 is, of course, driven in unison with segment 26 resulting in an additional length of the continuous strip material 8 being applied to segment 25 (FIG. 22) and thereafter onto the adjacent segment 26. When the leading edge 26′ of segment 26 and the abutting trailing edge 25″ of segment 25 have reached the aforesaid predetermined position with respect to the cutting means 5 the rotational movement of drum 20 is stopped and the latter drum is brought back to its rearmost position as shown in FIG. 23. The segment 26 is locked in place by actuation of solenoid 27d with the leading edge of segment 26 and the trailing edge of segment 25 in registry once more with the cutting path of the cutter 50. The next strip portion 8a located on segment 25 is then severed by traverse of the cutter, as previously described, while at substantially the same time, the intermediate drum 30 is lowered from its upper rest position (FIG. 22) through its intermediate position (FIG. 19) into its lowermost position (FIG. 23) i.e. into tangential contact with the breaker building drum 40. Lowering the drum 30 from its upper rest, to its lowermost position is accomplished by the simultaneously extension of both the actuators 35a and 35b in opposition to the force of spring means 37a, 37b. The previously trailing edge of strip portion 8a, as the latter was applied to drum 30, now becomes the leading edge of strip portion 8a in its contact with the strip portion 8b previously applied to the breaker building drum 40. Upon contact of this trailing edge of strip portion 8a with the surface, on drum 40, of the previously applied strip portion 8b, the drive means 38 of drum 30 is actuated, and electromagnetic coupling means 38d thereof engaged, for rotating the drum 30 about its axis in a clockwise direction. The rotation results in counterclockwise rotation of the freewheeling drum 40 in tangential contact therewith, the latter being frictionally driven by the drum 30. Due to the tackiness of the engaging surfaces of strip portions 8a and 8b the first contacting edge of strip portion 8a adheres to the surface of portion 8b and initiates the transfer of the rest of strip portion 8a onto the portion 8b on drum 40. The tackiness of the engaging surfaces of strip portions 8a and 8b thus providing sufficient adhesive force to overcome the magnetic attraction between the drum 30 and the strip portion 8a thereon. When the entire strip portion 8a is wound onto the drum 40 over strip 8b thereon, so as to constitute the outer ply of the carcass breaker, the rotational motion of the intermediate drum 30 is stopped. By suitably releasing pressure fluid from the cylinder 35b only, the drum 30 is brought back to its intermediate position under the influence of the spring means 37a, 37b (FIG. 24) ready to receive the next strip portion 8a. It will be noted that in this position of drum 30 the actuator 35a remains in extended condition.

In the positions indicated in FIG. 24, the elements of the apparatus are ready to repeat the operating cycle previously described and the initiation of which is illustrated further in FIG. 25 which is similar, except for the rotational position of the parts, to FIG. 17. It will be understood that the cycles shown and described herein may be repeated periodically in a manner identical to that described above.

After a pair of breaker plies 8a and 8b has been applied in the manner described above, to the breaker building drum 40, the latter may have a strip of tread rubber (not shown) applied thereto without interfering with the above described cycles of the apparatus. The tread rubber may either be applied to the breaker building drum in the position thereof illustrated in the drawings, or the drum 40 may first be moved axially to another work station for such purpose.

It will be seen that as a result of applying the inner breaker ply 8b directly from the main transfer drum onto the breaker building drum 40, with the leading edge of the ply 8b being applied first, while applying the outer breaker ply 8a first to the intermediate drum 30 and only later, from said intermediate drum 30 onto the drum 40 (the initially trailing edge of strip 8a becoming the first edge of said strip to be applied to drum 40) the breaker building drum 40 rotates in the same direction for both such applications. In other words, the drum 40 is for each strip applied thereto rotated in a counterclockwise direction as viewed in FIGS. 14–25. The application of alternate ones of the strips first onto the intermediate drum 30 and only then onto drum 40 while the remaining strips are applied directly from drum 20 to drum 40 results in consecutive breaker strips applied to drum 40 being turned with respect to one another so that the cords of adjacent plies built on drum 40 are crossed symmetrically with respect to each other thus forming a breaker in which the cords of one ply in each pair of plies form a cross angle to the cords of the second ply in each pair while using only a single source of continuous bias-cut breaker strip.

It will be understood by those skilled in the art that suitable conventional electrical and fluid circuits would be employed in the foregoing tire building machine to automatically or manually regulate the various movements of the various parts of the machine as well as to synchronize the operations of the various components of the machine with respect to one another.

While particular embodiments of this invention have been shown and described, it will be obvious to those skilled in the art that various changes and modifications may be made without departing from this invention in its broader aspects, and it is, therefort, intended in the appended claims to cover all such changes and modifications as fall within the true spirit and scope of this invention.

Having thus described my invention, what I claim and desire to protect by Letters Patent is:

1. In an apparatus for building annular breakers from a continuous strip of bias-cut breaker material, in combination:
   first rotatable drum means adapted to peripherally support the end portion of the continuous strip;
   severing means associated with said first rotatable drum means for severing portions of said continuous strip thereon;
   second rotatable drum means adjacent to but normally spaced from said first drum means and adapted to peripherally support thereon a severed strip portion;
   third rotatable drum means comprising a building drum positioned adjacent to but normally spaced from said first and second drum means and adapted to peripherally receive thereon a pair of severed strip portions;
   and shifting means associated with said drum means for placing said first and second, said first and third, and said second and third drum means into tangential substantially rolling contact in such sequence that alternate ones of said severed portions of strip material are applied to said building drum directly by said first drum means and the remaining ones of said severed portions of strip material are applied first by said first drum means to said second drum means and then by said second drum means to said building drum,
   whereby pairs of breaker plies are built up on said building drum with the cords of one ply in each pair forming a crossing angle to the cords of the second ply in each pair.

2. The apparatus according to claim 1 wherein the sequence of contact between said drum means is such that said second drum means stores the severed strip portion previously applied thereto during the time said first drum means directly applies the next succeeding severed strip portion to said building drum.

3. The apparatus according to claim 1 wherein the breaker material is magnetically attractable, said apparatus further comprising first magnet means provided on said first drum means for supporting said strip thereon; and second magnet means on said second drum means for attracting away from said first drum and onto said second drum means said remaining ones of said severed strip portions when said first and second drum means are in contact, said second magnet means displaying a greater magnetic attraction force than said first magnet means.

4. The apparatus according to claim 3, further comprising third magnet means disposed on said building drum, said third magnet means displaying a greater magnetic attraction force than said first magnet means whereby the transfer of said alternate strip portions from said first to said third drum means is facilitated.

5. The apparatus according to claim 4, wherein all of said magnet means comprise circumferentially extending permanent magnet strips.

6. The apparatus according to claim 5 wherein each of said drum means includes a cylindrically shaped surface portion saving a plurality of parallel circumferentially extending grooves therein, said permanent magnet strips comprising flexible magnetic strip material filling said grooves.

7. The apparatus according to claim 6 wherein the number of said magnet strips on each of said second and third drum means exceeds the number of said magnet strips provided on said first drum means.

8. The apparatus according to claim 5 wherein said third magnet means further comprises a permanent magnet member fixed to said building drum and having a pole located in the region of the periphery thereof to supplement, in said region, the magnetic attraction force there exhibited by said third magnet means, whereby the initiation of the transfer of a breaker strip onto said building drum is facilitated.

9. The apparatus according to claim 1 wherein said first rotatable drum means comprises a pair of segmental portions of a common cylinder rotatable about a common axis.

10. The apparatus according to claim 9 wherein said first rotatable drum means comprises a pair of wheel means, and means supporting said pair of wheel means for independent rotation about said common axis, each of said wheel means having fixed to the periphery thereof one of said pair of segmental portions.

11. The apparatus according to claim 10 wherein each of said wheel means comprises a hub portion, said support means comprising a shaft for rotatably receiving said hub portions thereon.

12. The apparatus according to claim 11 wherein said wheel means are closely spaced on said shaft and define between themselves a disc-shaped space.

13. The apparatus according to claim 10 wherein each of said pair of segmental portions comprises an exterior surface portion which when developed in a plane is of parallelogram shape.

14. The apparatus according to claim 13 wherein said exterior surface portions of said pair of segments are substantially identical in configuration with the inner and outer breaker plies, respectively, of a breaker to be built on said building drum.

15. The apparatus according to claim 14 wherein said pair of coaxial wheel means are closely spaced with respect to each other on opposite sides of a median plane, each of said exterior surface portions of said segments including a pair of opposed parallel shorter edges and a pair of opposed parallel longer edges, said longer edges of both said surface portions being parallel to said median plane of said wheel means and said shorter edges being inclined with respect to said median plane.

16. The apparatus according to claim 15 wherein said surface portion of one of said wheel means extends in axial direction toward and into overlapping relationship with the periphery of the other of said pair of wheel means while the surface portion of the other of said segments on the other of said pair of wheel means extend toward and into overlapping relationship with the periphery of said one wheel means, said surface portions being circumferentially distributed about said common axis and the combined circumferential length of said surface portions being less than the length of the circumference of said common cylinder.

17. The apparatus according to claim 16 wherein said segments are relatively rotatable with respect to each other, adjacent ones of said shorter edges on opposite ones of said pair of segments being parallel to each other and lying in the surface of said common cylinder.

18. The apparatus according to claim 17 further comprising means associated with said wheels for relatively rotating the latter between a first position in which one opposing pair of adjacent shorter edge portions of said pair of segments engage one another and a second position in which the other opposing pair of adjacent shorter edge portions of said pair of segments engage one another.

19. The apparatus according to claim 18 further comprising releasable locking means associated with said wheel means for releasably locking said pair of wheel means together whenever the latter are in either of said positions.

20. The apparatus according to claim 19 wherein said releasable locking means comprises magnet means.

21. The apparatus according to claim 20 wherein said magnet means comprises a pair of oppositely facing permanent magnets fixed to one of said wheel means in the space intermediate said pair of wheel means, and a pair of angularly spaced magnetizable members fixed to the other of said wheel means in the space intermediate said pair of wheel means, one of said magnets contacting the corresponding one of said pair of members when said wheels are in one of said relative rotational positions thereof and the other of said magnets contacting the other of said members when said wheels are in the other of said relative rotational positions.

22. The apparatus according to claim 10 wherein said shifting means comprises pivot menas having a fixed pivot axis parallel to and spaced from said common axis and including means supporting said first drum means for pivotal movement about said fixed pivot axis between a rear position in which said first drum means is located adjacent said severing means and spaced from said building drum, an intermediate position in which said first drum means is spaced both from said severing means and said building drum, and a forward position in which said first drum means is located adjacent said building drum.

23. The apparatus according to claim 22 wherein said severing means and said building drum are spaced from each other and said fixed pivot axis is located intermediate said spaced severing means and said building drum.

24. The apparatus according to claim 22 further comprising drive means for rotatably driving said first drum means about its own axis, said drive means including a first driven member coaxial with and fixed to one of said wheels so as to be rotatable therewith, a second driven member coaxial with and fixed to the other of said wheels so as to be rotatable therewith, a pair of drive members respectively coaxial with said fixed pivot axis and supported for rotation about the latter, and means drivingly connecting each of said drive with the corresponding one of said driven members so as to rotate said first drum means about its own axis in response to actutaion of said drive means irrespective of the pivotal position of said first drum means.

25. The apparatus according to claim 24 wherein each of said pair of drive members comprises an independently operable clutch means.

26. The apparatus according to claim 22, wherein said pivot means comprises bell-crank means, means centrally supporting said bell-crank means for pivotal movement about said fixed pivot axis, a shaft rotatably supporting said first drum means, means rigidly connecting said shaft to one end portion of said bell-crank means, and actuating means cooperating with the other end portion of said bell-crank means for pivoting the latter about said fixed pivot axis.

27. The apparatus according to claim 26 wherein said means centrally supporting said bell-crank means comprises a stationary cylindrical sleeve member supported coaxially with respect to said fixed pivot axis, said bell-crank means comprising a crank arm provided with a transverse bore for rotatably supporting said bell-crank means on said sleeve member.

28. The apparatus according to claim 27 further comprising drive means for rotatably driving said first drum means, said drive means including a drive shaft rotatably received in and extending through said stationary sleeve member, a drive member fixed to said drive shaft, a driven member fixed to one of said wheels, and means drivingly connecting said driven means with said drive member.

29. The apparatus according to claim 22 further comprising a pair of locking means respectively fixed positioned on opposite sides of the region occupied by said first drum means when the latter is in said rear position thereof and each adapted to respectively lockingly engage a respective one of said pair of wheels when said first drum means is in said rear position whereby further movement of such wheel is prevented for the duration of the locking engagement.

30. The apparatus according to claim 29 wherein said locking means comprises a fixed support, a pair of solenoids fixed to said support at opposite sides of said rear position to said first drum means and having movable plungers, and means on each of said wheels for lockingly engaging the respective one of said movable plungers in response to actuation of the respective solenoid.

31. The apparatus according to claim 22 further comprising frame means supporting said severing means and shiftably supporting said first and second drum means, said severing means comprising a reciprocable carriage, a guide means fixed to said frame means and inclined with respect to the equatorial plane of said first drum means for guiding said carriage along an inclined path, a rotary cutter, and means swivably supporting said cutter on said carriage whereby said cutter can follow said inclined path along the contour of said first drum means for cutting the strip material thereon in response to reciprocable movement of said carriage.

32. The apparatus according to claim 31 wherein said severing means further comprises a pair of cutter guide members located at opposite ends of said inclined cutter path, respectively, closely adjacent to the opposite side edges of said segments when said first drum means is in said rear position thereof, said cutter guide members being in registry with the surface of said segments so as to provide a smooth transition for the cutter when the latter leaves said surface at said opposite ends of its travel along said inclined path.

33. The apparatus according to claim 32 wherein the said surface of each of said segments is, when developed in a plane, of parallelogram shape having longer sides parallel to the median plane of said first drum means and having shorter sides inclined with respect to said median plane, the angle of inclination of said shorter sides corresponding to the angle of inclination of said cutter path with respect to said median plane so that said cutter will traverse the said surface in parallelism with said shorter sides of said segments.

34. The apparatus according to claim 33 further comprising a pair of edge strips, respectively, rigidly connected to alternate shorter side edges of said pair of segments and adapted to provide a hard continuous cutting surface along which said cutter rolls during the cutting stroke.

35. The apparatus according to claim 34 wherein said first drum means comprises means for releasably holding the continuous strip material to said sector surfaces.

36. The apparatus according to claim 35, further comprising locking means adjacent said rear position of said first drum means for locking a selected one of said wheels against movement while said cutter traverses its path.

37. The apparatus according to claim 36 wherein the combined angular extent of said segments is less than 360° by a predetermined angle, said apparatus further comprising drive means for independently rotating said pair of wheels, said drive means comprising braking means for selectively preventing rotational movement of one of said wheels while said drive means drives the other of said wheels through said predetermined angle, with respect to said one wheel.

38. The apparatus according to claim 1 further comprising a supply means for supplying the continuous strip of breaker material, said supply means including a drive means and control means associated with said drive means for controlling the rate of speed at which said continuous strip of breaker material is delivered to said first drum means.

39. The apparatus according to claim 38 wherein said control means comprises a sensing means positioned adjacent the path of the continuous strip upstream of said first drum means and adapted to sense the tensile forces acting on said continuous strip, said control means operating on said supply means to increase the rate of delivery of said strip in response to said sensing means sensing an increase in tension and to decrease said rate of delivery in response to said sensing means sensing a decrease in tension.

40. The apparatus according to claim 1 further comprising frame means, said shifting means comprising a pivot means supported on said frame means and having a pivot axis parallel to and spaced from the axis of said second drum means, arms means pivotably supported on said pivot means, and means provided on said arm means at a location thereon spaced from said pivot aixs for rotatably supporting said second drum means thereon.

41. The apparatus according to claim 40 wherein said arm means comprises a pair of spaced parallel arms connected at one end thereof to said pivot means, a shaft rotatably journalled at opposite ends thereof to the free ends of said arms respectively, and having fixed thereto, intermediate said arms, said second drum means.

42. The apparatus according to claim 41 further comprising actuator means connected to said frame means and cooperating with said pair of arms for pivoting the latter and therewith said second drum means about said pivot axis between a rest position in which said second drum is spaced from said first and third drum means, an intermediate position in which said second drum is spaced at least from said third drum means and a third position in which said second drum means is in tangential contact with said building drum.

43. The apparatus according to claim 42 further comprising a drive means comprising clutch means cooperating with said second drum means for selectively rotating the latter about its own axis.

44. The apparatus according to claim 43 further comprising bias means associated with said arm means for permanently urging the latter in a direction to move said second drum means toward said rest position thereof.

45. The apparatus according to claim 9 wherein said severing means includes a cutter, means for moving said cutter along an inclined path with respect to the median plane of said first drum means transversely across the cylindrical surface defined by said segmental portions, and means associated with said cutter for urging the latter toward said surface with a constant pressure throughout the non-linear path traversed by the cutter.

46. The apparatus according to claim 45 wherein said moving means includes an inclined guide means defining said inclined path, a carriage reciprocable along said guide means and actuator means associated with said carriage for moving the latter along said inclined path.

47. The apparatus according to claim 45 wherein said urging means comprises means swivably supporting said cutter on said carriage for swivable movement of said cutter transverse to said inclined path, and fluid pressure means on said carriage and connected to said swivable means for urging said cutter toward said cylinder surface under constant pressure.

48. An apparatus for building, from a continuous strip of breaker material, annular breakers in which the cords of one ply form a crossing angle with the cords of the next adjacent ply, comprising, in combination:

first drum means comprising a pair of segmental portions of a common cylinder rotatable about a common axis and adapted to support the end portion of the continuous strip;
a rotatable building drum;
severing means spaced from said building drum for severing portions of said continuous strip on said segmental portions;
means for moving said first drum means between a position adjacent to said severing means, an intermediate position and a position tangentially contacting said drum;
a rotatable transfer drum;
means for moving the transfer drum between a position remote from said building drum, an intermediate position tangentially contacting said common cylinder when the latter is in its intermediate position, and a position tangentially contacting said building drum, whereby alternate ones of said severed portions of strip material are applied to said building drum directly by said segmental portions of said common cylinder, while the remaining ones of said severed portions of strip material are applied first to said transfer drum by said segmental portions and then by said transfer drum to said building drum, so that from a single source of breaker material pairs of breaker plies are built up on said building drum with the cords of one ply in each pair forming a crossing angle to the cords of the second ply in each pair.

References Cited

UNITED STATES PATENTS

| | | | |
|---|---|---|---|
| 1,938,787 | 12/1933 | Abbott | 156—405 |
| 2,918,105 | 12/1959 | Harris | 156—406X |
| 3,071,179 | 1/1963 | Tourtellotte et al. | 156—405 |
| 3,157,542 | 11/1964 | Trevaskis | 156—405X |

BENJAMIN A. BORCHELT, Primary Examiner

STEPHEN C. BENTLEY, Assistant Examiner

PO-1050
(5/69)

UNITED STATES PATENT OFFICE
CERTIFICATE OF CORRECTION

Patent No. 3,547,732              Dated December 15, 1970

Inventor(s) JEAN LEBLOND

It is certified that error appears in the above-identified patent and that said Letters Patent are hereby corrected as shown below:

Column 16, Line 41, the word "saving" should read -- hav-
Column 17, Line 62, the word "menas" should read -- mean
Column 18, Line 45, the word "fixed" should read -- fixe
Column 19, Line 60, the word "arms" should read -- arm--
Column 19, Line 62, the word "aixs" should read -- axis Signed and sealed this 19th day of March 1974.

(SEAL)
Attest:

EDWARD M. FLETCHER, JR.
Attesting Officer

C. MARSHALL DANN
Commissioner of Pate